(12) United States Patent
Fujita et al.

(10) Patent No.: US 12,135,416 B2
(45) Date of Patent: Nov. 5, 2024

(54) LIGHT DEFLECTOR, DISTANCE MEASURING DEVICE, PROJECTION DEVICE, AND MOBILE OBJECT

(71) Applicants: Tetsumaru Fujita, Hyogo (JP); Masayuki Fujishima, Kanagawa (JP); Junichi Konishi, Hyogo (JP); Hidenori Kato, Hyogo (JP)

(72) Inventors: Tetsumaru Fujita, Hyogo (JP); Masayuki Fujishima, Kanagawa (JP); Junichi Konishi, Hyogo (JP); Hidenori Kato, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 799 days.

(21) Appl. No.: 17/350,089

(22) Filed: Jun. 17, 2021

(65) Prior Publication Data

US 2021/0396994 A1 Dec. 23, 2021

(30) Foreign Application Priority Data

Jun. 19, 2020 (JP) .................................. 2020-106589
Apr. 23, 2021 (JP) .................................. 2021-073478

(51) Int. Cl.
 *G02B 26/08* (2006.01)
 *G02B 26/10* (2006.01)
 *G01S 17/89* (2020.01)
(52) U.S. Cl.
 CPC ....... *G02B 26/0858* (2013.01); *G02B 26/101* (2013.01); *G02B 26/105* (2013.01); *G01S 17/89* (2013.01)

(58) Field of Classification Search
None
See application file for complete search history.

(56) References Cited

U.S. PATENT DOCUMENTS

| | | | | |
|---|---|---|---|---|
| 6,122,089 A | * | 9/2000 | Minamoto | ........... G02B 26/085 |
| | | | | 359/223.1 |
| 2011/0085220 A1 | * | 4/2011 | Mochizuki | ........... G02B 26/105 |
| | | | | 359/198.1 |
| 2017/0350759 A1 | | 12/2017 | Azumi | |

(Continued)

FOREIGN PATENT DOCUMENTS

| | | |
|---|---|---|
| JP | 2000-214407 | 8/2000 |
| JP | 2003-005487 | 1/2003 |

(Continued)

*Primary Examiner* — Jennifer D. Carruth
(74) *Attorney, Agent, or Firm* — IPUSA, PLLC

(57) ABSTRACT

A light deflector includes a movable device; a drive unit configured to drive the movable device; an input wiring board configured to apply electric power from the drive unit to the movable device; and an anisotropic conductive resin film through which the input wiring board is connected to an input part. The movable device includes a movable portion including a reflector, between a pair of drive beams; a pair of supporting parts supporting the pair of drive beams; and a mount unit secured to the pair of supporting parts. The pair of drive beams supports the movable portion to allow the movable portion to oscillate around an oscillation axis. Each of the pair of drive beams includes a beam member and an actuator. At least one of the pair of supporting parts includes the input part to which electric power is input from the input wiring board to the actuator.

16 Claims, 22 Drawing Sheets

(56) References Cited

U.S. PATENT DOCUMENTS

| 2017/0374325 | A1  | 12/2017 | Itoh |
| 2018/0215608 | A1  | 8/2018  | Fujishima |
| 2018/0252578 | A1  | 9/2018  | Suzuki |
| 2018/0267293 | A1  | 9/2018  | Fujishima |
| 2019/0293923 | A1* | 9/2019  | Ghahremani ......... B81B 7/0067 |
| 2020/0400940 | A1  | 12/2020 | Fujishima |
| 2021/0109342 | A1  | 4/2021  | Fujishima |
| 2021/0149025 | A1  | 5/2021  | Konishi |

FOREIGN PATENT DOCUMENTS

| JP | 2010-151958 | 7/2010 |
| JP | 2020-101587 | 7/2020 |
| JP | 2020-101588 | 7/2020 |

\* cited by examiner

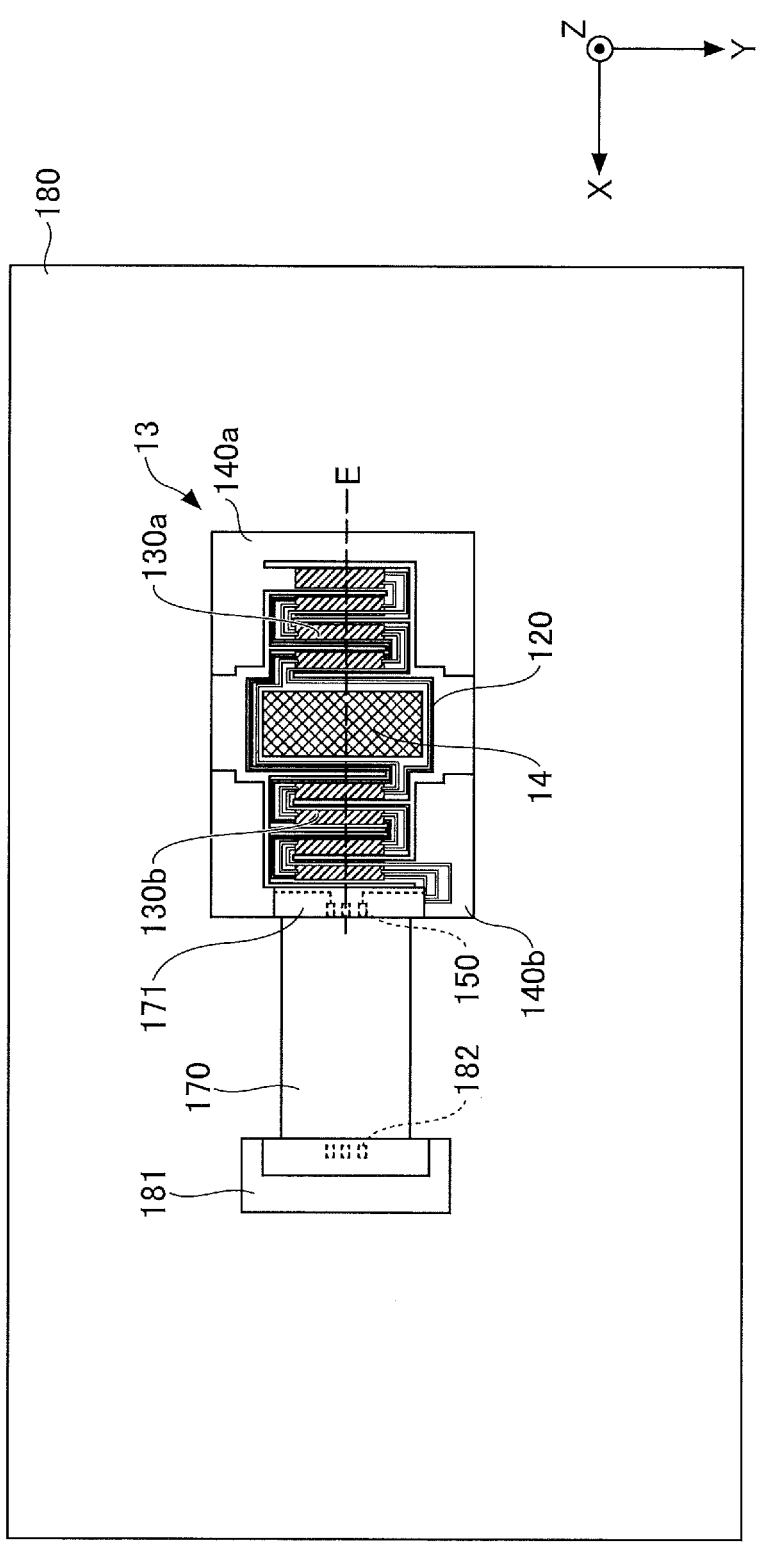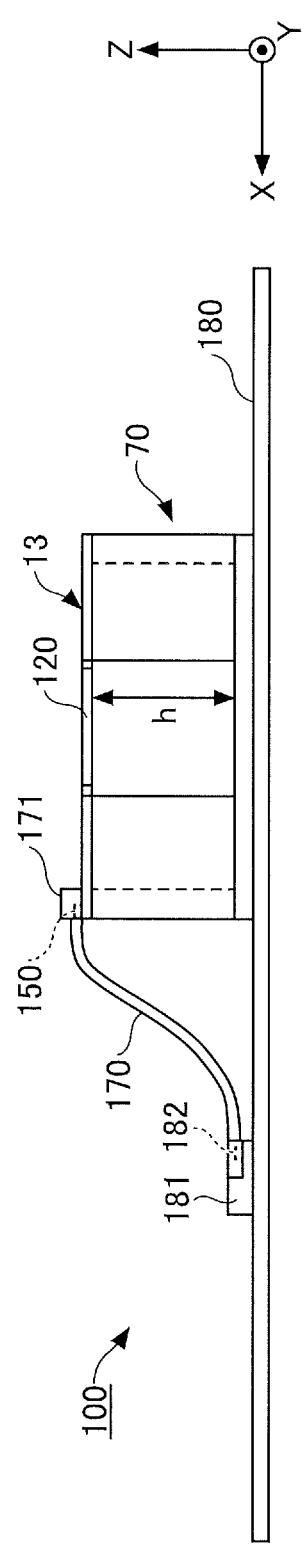

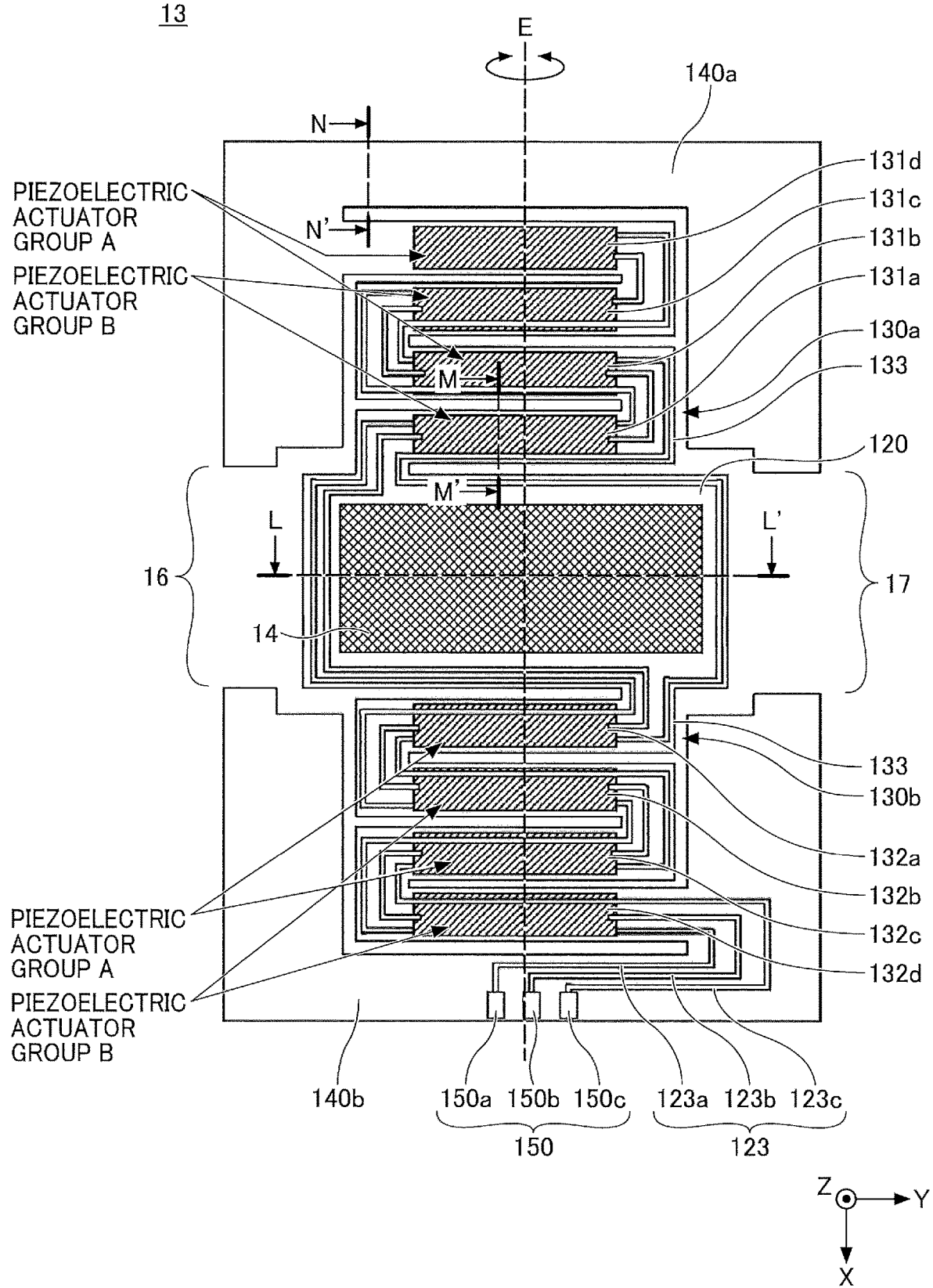

LIGHT DEFLECTOR, DISTANCE MEASURING DEVICE, PROJECTION DEVICE, AND MOBILE OBJECT

CROSS-REFERENCE TO RELATED APPLICATIONS

This patent application is based on and claims priority pursuant to 35 U.S.C. § 119(a) to Japanese Patent Application No. 2020-106589, filed on Jun. 19, 2020 and Japanese Patent Application No. 2021-073478, filed on Apr. 23, 2021, in the Japan Patent Office, the entire disclosure of which is hereby incorporated by reference herein.

BACKGROUND

Technical Field

Embodiments of this disclosure relate to a light deflector, a distance measuring device, and a mobile body.

Related Art

In recent years, with the development of micromachining technology applying semiconductor manufacturing technology, development of micro electro mechanical systems (MEMS) device manufactured by micromachining silicon or glass is advancing.

In the operations of a mobile object such as a vehicle, a ship, and an aircraft, devices that detect the position of an object in a wide range of angle are used. As an example of such devices, a light detection ranging (LiDAR) device is known that uses time-of-flight (TOF) method in which the distance to the object is measured based on the length of time it takes while the laser beams that are emitted from the laser beam source are reflected by an object and then return to the sensor.

SUMMARY

A light deflector includes a movable device; a drive unit configured to drive the movable device; an input wiring board configured to apply electric power from the drive unit to the movable device; and an anisotropic conductive resin film through which the input wiring board is connected to an input part. The movable device includes a movable portion including a reflector, between a pair of drive beams; a pair of supporting parts supporting the pair of drive beams; and a mount unit secured to the pair of supporting parts. The pair of drive beams supports the movable portion to allow the movable portion to oscillate around an oscillation axis. Each of the pair of drive beams includes a beam member and an actuator. At least one of the pair of supporting parts includes the input part to which electric power is input from the input wiring board to the actuator.

A light deflector includes a movable device; a sensor; an output wiring board configured to output information based on electric power generated by the movable device to the sensor; and an anisotropic conductive resin film through which the output wiring board is connected to an output part. The movable device includes: a movable portion including a reflector, between a pair of drive beams; the pair of drive beams supporting the movable portion to allow the movable portion to oscillate around an oscillation axis; a pair of supporting parts supporting the pair of drive beams; and a mount unit secured to the pair of supporting parts. Each of the pair of drive beams including a beam member and an actuator. At least one of the pair of supporting parts includes the output part configured to output the information to the sensor through the output wiring board.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1A is a plan view of a configuration of a light deflector according to an embodiment of the present disclosure;

FIG. 1B is a side view of the configuration the light deflector according to an embodiment of the present disclosure;

FIG. 2 is a plan view of a configuration of a movable device according to a fourth embodiment of the present disclosure;

Figure 3A:
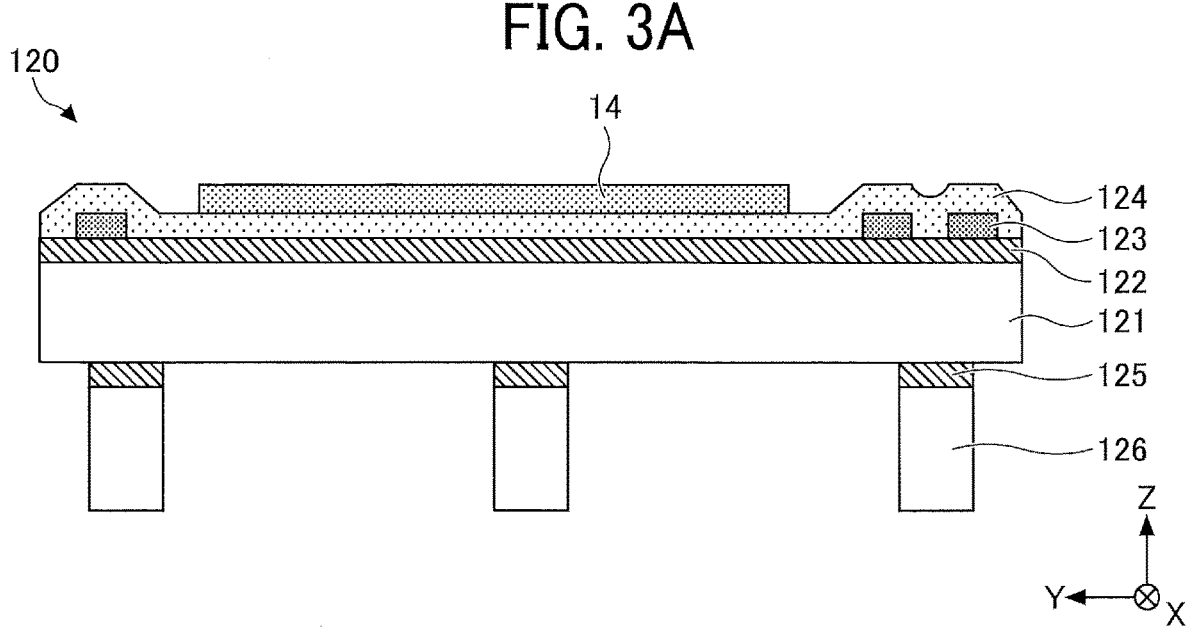
FIG. 3A is a cross-sectional view of the movable device taken along line L-L' in FIG. 2.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The embodiments of the present disclosure achieve a light deflector with a movable device and a drive unit stably coupled to each other.

In the drawings described below, a direction parallel to an oscillation axis of a movable portion of a light deflector is defined as an X direction, a direction orthogonal to the oscillation axis of the movable portion is defined as a Y direction, and a direction (i.e., height direction) orthogonal to each of the X direction and the Y direction is defined as a Z direction. The E axis is the oscillation axis.

First Embodiment

Some embodiments of the present disclosure are described below with reference to the drawings. FIGS. 1A and 1B are illustrations of an overall configuration of a light deflector 100 according to an embodiment of the present disclosure. FIG. 1A is a plan view of the light deflector 100 as viewed from +Z side of the light deflector 100, and FIG. 1B is a side view of the light deflector 100 from the +Y side.

As illustrated in FIGS. 1A and 1B, the light deflector 100 includes a movable device 13 and a flexible printed circuit (FPC) 170.

The movable device 13 includes a movable portion 120 with a reflecting surface 14, and a pair of drive beams 130*a* and 130*b* supporting the movable portion 120 at both sides of the movable portion 120 to allow the movable portion 120 to oscillate around the E axis. The movable device 13 further includes a pair of supporting parts 140*a* and 140*b* supporting the pair of drive beams 130*a* and 130*b*, and a mount unit 70 to which the pair of support parts 140*a* and 140*b* are secured. The reflecting surface 14 is planar on the +Z side of the movable portion 120, and is an example of a reflector that reflects incident light.

The circuit board 180 is an example of a drive unit to drive the movable device 13. The circuit board 180 includes a drive device (drive circuit) that drives the movable device 13, and a control device (control circuit) that controls the drive device.

The FPC 170 is a flexible wiring board that maintains its electrical characteristics when deformed. The FPC 170 is an example of an input wiring board that enables application of voltage to the movable device 13 from the circuit board 180.

In addition, electrode connection portion 150 (150*a*, 150*b*, and 150*c*) is provided on the +Z surface of the supporting part 140 *b* in the movable device 13. The electrode connection portion 150 is an example of a voltage input part through which voltage is input from the FPC 170 to the piezoelectric actuators on the drive beams 130*a* and 130*b*. In addition, the electrode connection portion 150 is electrically connected to a wiring-side electrode portion at one side of the FPC 170 via a device-side connector 171.

Another wiring-side electrode portion at another side of the FPC 170 is electrically connected to a circuit-side electrode portion 182 on the circuit board 180 via a board-side connector 181. The movable device 13 causes the movable portion 120 to oscillate around the E axis using a drive voltage applied from the circuit board 180 through the FPC 170, to enable light reflected by the reflecting surface 14 to be deflected in a direction orthogonal to the E axis, thus achieves scanning with light in the direction orthogonal to the E axis.

Notably, an oscillation angle of the movable portion 120 is to be increased to increase the scanning angle of the light reflected by the reflecting surface 14. However, if the oscillation angle of the movable portion 120 is increased (i.e., the movable portion 120 significantly oscillates) with a short distance between the movable portion 120 and the circuit board 180 in the Z direction, the movable portion 120 might collides with the circuit board 180 downstream of the movable portion 120 in the −Z direction. This might restrict the oscillation angle of the movable portion 120.

To avoid such a situation, in at least one embodiment, the mount unit 70 is disposed between the movable portion 120 and the circuit board 180 to increase a distance h between the movable portion 120 and the circuit board 180 in the Z direction. This configuration prevents the movable portion 120 from colliding with the circuit board 180 even with an increase in the oscillation angle of the movable portion 120.

Further, if the electrode connection portion 150 of the movable device 13 and the circuit-side electrode portion 182 of the circuit board 180 are connected to each other by wire bonding with a long distance h between the movable portion 120 and the circuit board 180 in the Z direction, wires for such wire bonding might be easily cut off, or the junction of the electrodes might easily come off. This might reduce the stability of the mechanical bonding and electrical connection.

In embodiments of the present disclosure, the movable device 13 is connected to the circuit board 180 via the FPC 170, and the electrode connection portion 150 of the movable device 13 is connected to the wiring-side electrode portion of the FPC 170 through an anisotropic conductive resin film. This configuration enables a stable connection of the movable device 13 and the circuit board 180.

Figure 3B:
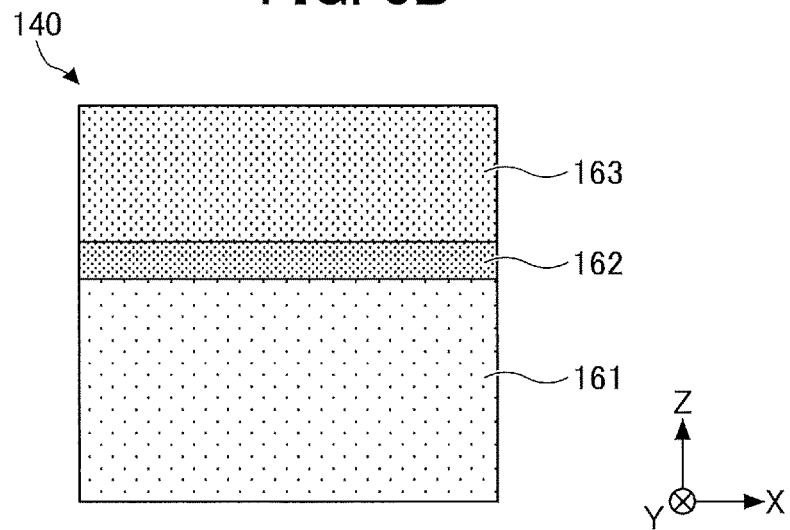
FIG. 3B is a cross-sectional view of the movable device taken along line N-N' in FIG. 2.
Figure 3C:
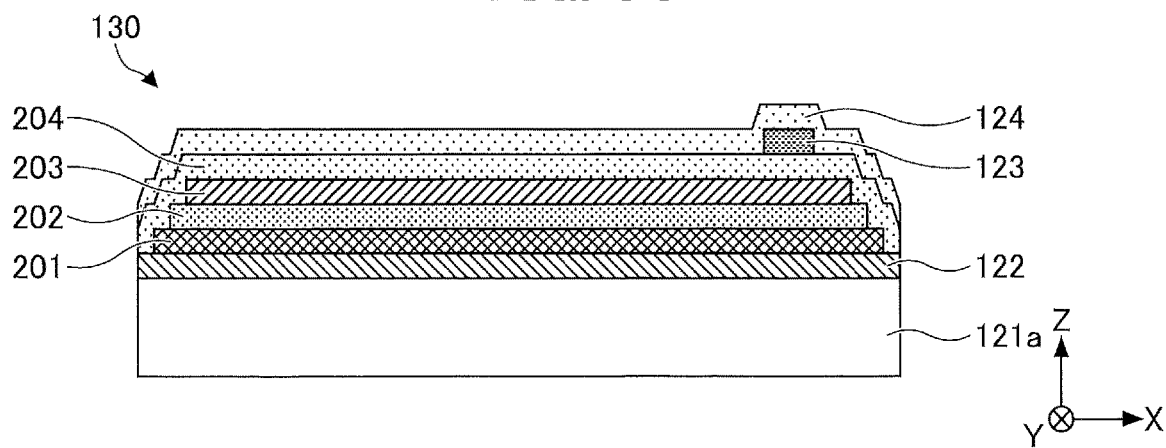
FIG. 3C. is a cross-sectional view of the movable device taken along line M-M' in FIG. 15.
Figure 4:
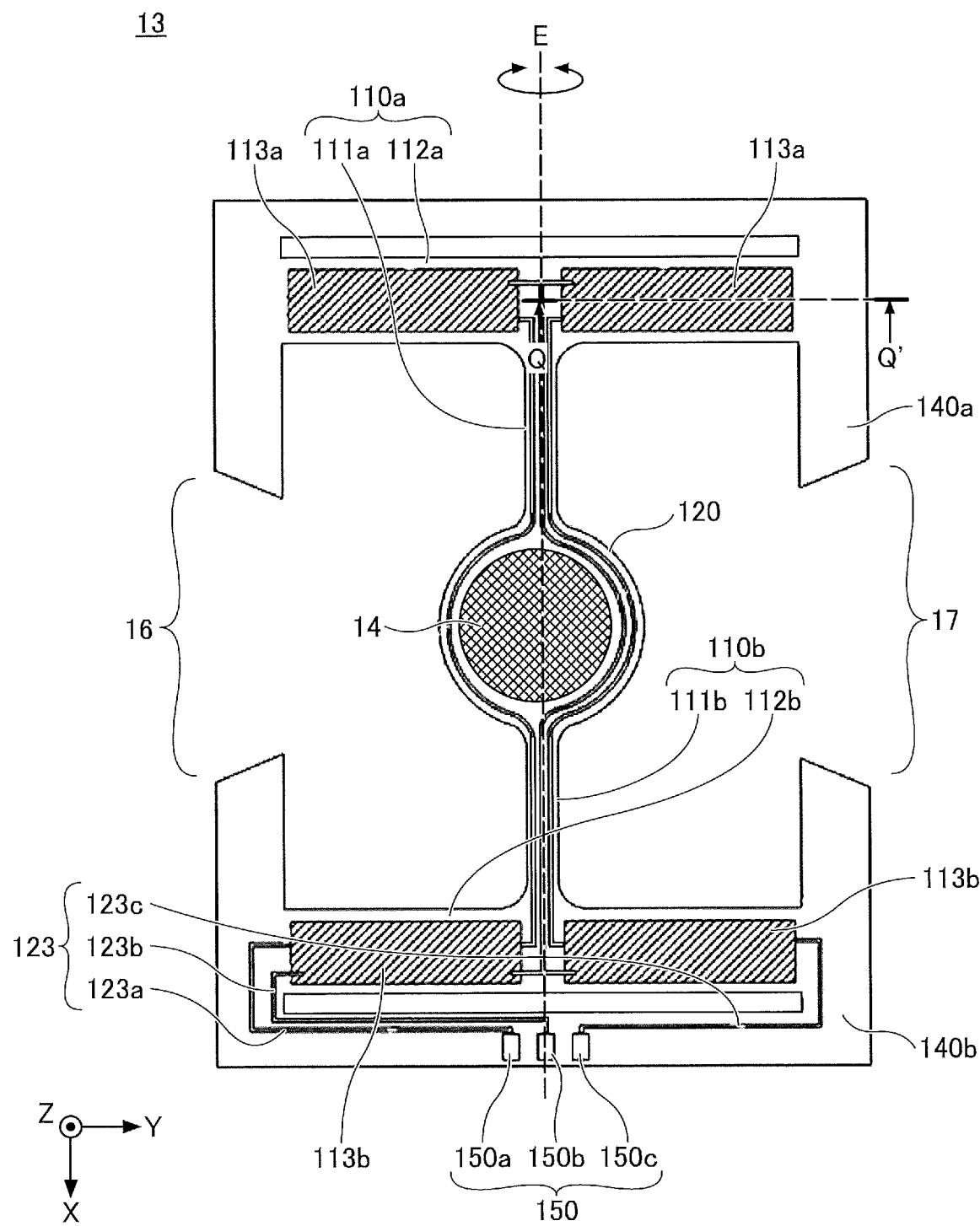
FIG. 4 is a plan view of a configuration of a movable device according to another embodiment of the present disclosure.
Figure 5:
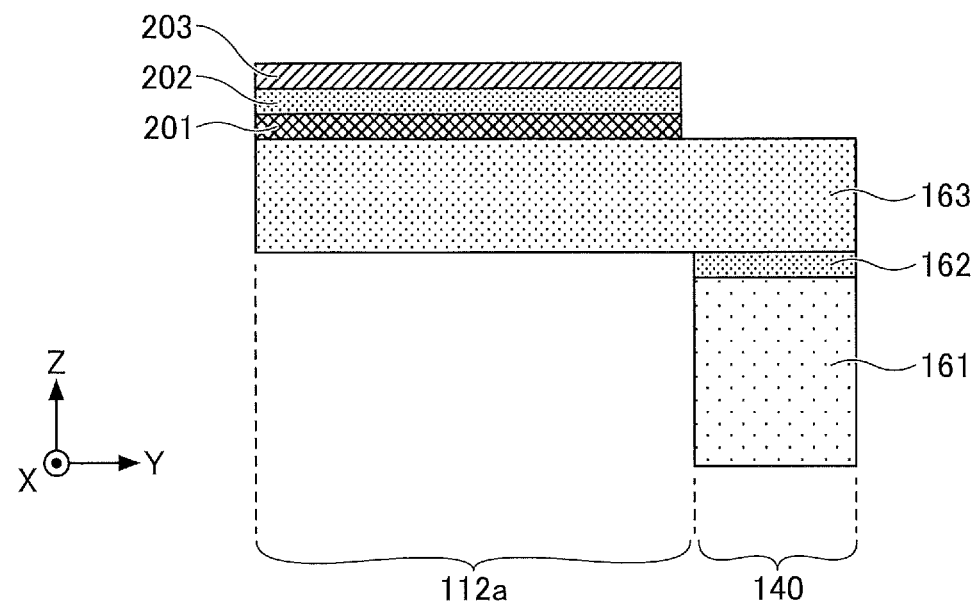
FIG. 5 is a cross-sectional view of the movable device taken along line Q-Q' in FIG. 4.
Figure 6:
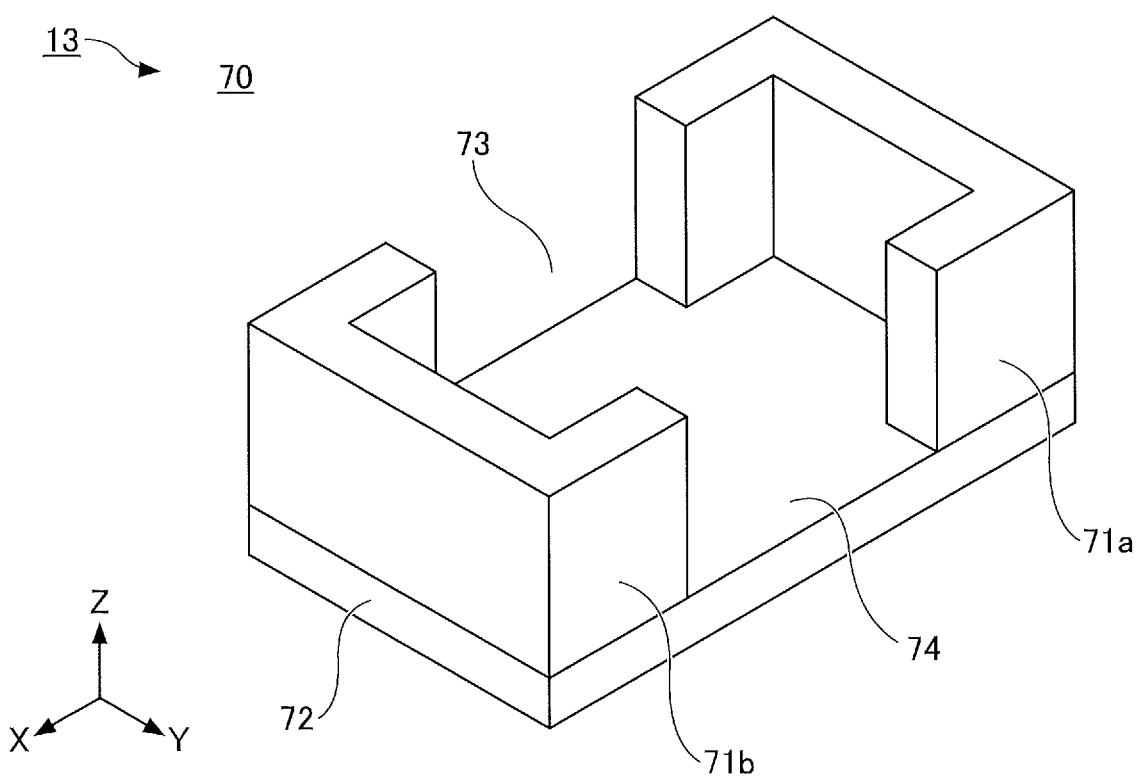
FIG. 6 is an illustration of a configuration of a mount unit according to an embodiment of the present disclosure.

The following describes configurations of the movable device 13 with reference to FIGS. 2 to 6. FIGS. 2, 3A, 3B, and 3C are illustrations of a first example configuration of the movable device 13. FIGS. 4 and 5 are illustrations of a second example configuration of the movable device 13. FIG. 6 is an illustration of an example configuration of the mount unit 70 of the movable device 13.

First Example Configuration

FIG. 2 is a plan view of the first example configuration of the movable device 13 with a both-side-support beam structure and capable of uniaxially deflecting light. FIG. 3A is a cross-sectional view of the movable device 13 taken along line L-L' in FIG. 2. FIG. 3B is a cross-sectional view of the movable device 13 taken along line N-N' in FIG. 2. FIG. 3C. is a cross-sectional view of the movable device 13 taken along line M-M' in FIG. 15.

As illustrated in FIG. 2, the movable device 13 includes a reflecting surface 14 that reflects incident light, a movable portion 120 on which the reflecting surface 14 is formed, drive beams 130a and 130b, and supporting parts 140a and 140b. FIG. 2 illustrates the reflecting surface 14 as an example of a rectangular reflecting surface; however, it is not limited thereto, and the shape of a reflecting surface may be another shape, such as a circle or an ellipsoid.

The drive beams 130a and 130b are an example of a pair of drive beams supporting the movable portion 120 at both sides of the movable portion 120 to enable the movable portion 120 to oscillate around the E axis parallel to the X axis. The drive beams 130a and 130b causes the movable portion 120 to oscillate so as to change the tilt of the reflecting surface 14 on the movable portion 120. The supporting parts 140a and 140b are an example of a pair of supporting part supporting the pair of drive beams 130a and 130b. The supporting part 140a supports the drive beam 130a, and the supporting part 140b supports the drive beam 130b.

The drive beam 130a is an example of a meandering beam having a meander structure (folded structure) including multiple beam members 133. The drive beam 130a has one end coupled to an outer edge portion of the movable portion 120, and has the other end coupled to an inner edge portion of the supporting part 140a. Each of the multiple beam members 133 included in the drive beam 130a is formed with piezoelectric actuators 131a to 131d. Each of the piezoelectric actuators 131a to 131d is an example of an actuator and can deform the drive beam 130a.

The drive beam 130b is an example of a meandering beam having a meander structure (folded structure) including multiple beam members 133. The drive beam 130b has one end coupled to an outer edge portion of the movable portion 120, and has the other end coupled to an inner edge portion of the supporting part 140b. Each of the multiple beam members 133 included in the drive beam 130b is formed with piezoelectric actuators 132a to 132d. Each of the piezoelectric actuators 132a to 132d is an example of an actuator, and can deform the drive beam 130b.

The location where the drive beam 130a is connected to the movable portion 120 and the location where the drive beam 130b is connected to the movable portion 120 are arranged point-symmetrically with respect to the center of the reflecting surface 14. Further, the location where the drive beam 130a is connected to the supporting part 140a and the location where the drive beam 130b is connected to the supporting part 140b are arranged point-symmetrically with respect to the center of the reflecting surface 14. In some examples, these locations are arranged ling-symmetrically with respect to the line (i.e., line parallel to the Y axis) orthogonal to the E axis on a plane parallel to the reflecting surface 14.

The supporting part 140b has an electrode connection portion 150, to which voltage from the circuit board 180 (see FIGS. 1A and 1B) is input, on the +Z surface. The electrode connection portion 150 includes a positive electrode connecting part 150a to which a positive voltage is input, a GND connecting part 150b connected to the GND, and a negative electrode connecting part 150c to which a negative voltage is input. The positive electrode connecting part 150a, the GND connecting part 150b, and the negative electrode connecting part 150c are examples of multiple voltage input parts (i.e., an input part) arranged in a direction (i.e., the Y direction) orthogonal to the E axis. The direction in which the positive electrode connecting part 150a, the GND connecting part 150b, and the negative electrode connecting part 150c are arranged is along the longitudinal direction (i.e., the Y direction) of each of the multiple beam members 133 constituting the drive beam 130a or the drive beam 130b.

Wiring 123 including at least one wire is provided in a region other than the reflecting surface 14 on the +Z surface of the movable portion 120 and on a +Z surface of each of the drive beams 130a and 130b. In a case where the wiring 123 includes multiple wires are provided in the region other than the reflecting surface 14 on +Z surface of the movable portion 120, the reflecting surface 14 is surrounded by the multiple wires (the wiring 123). Such an arrangement prevents the weight deviation. The piezoelectric actuators 131a to 131d on the drive beam 130a are electrically connected by the wiring 123 passing the surface of the movable portion 120, to the electrode connection portion 150 on the supporting part 140b. A voltage input to the electrode connection portion 150 is transmitted through the wiring 123 to each of the piezoelectric actuators 132a to 132d and also to each of the piezoelectric actuators 131a to 131d through the surface of the movable portion 120. The drive voltage input through the electrode connection portion 150 is applied to both of the drive beams 130a and 130b through the wiring 123.

The wiring 123 include a positive voltage conducting wire 123a through which a positive voltage signal is transmitted, a GND conducting wire 123b connected to the GND, and a negative voltage conducting wire 123c through which a negative voltage signal is transmitted. The positive voltage conducting wire 123a is connected to the positive electrode connecting part 150a. The GND conducting wire 123b is connected to the GND connecting part 150b. The negative voltage conducting wire 123c is connected to the negative electrode connection part 150c.

Between the supporting part 140a and the supporting part 140b, an opening area where the supporting part 140 (the supporting parts 140a and 140b) does not exist is provided at each side of the movable portion 120 along the Y direction. Such an opening area defines light passing areas 16 and 17. The light passing areas 16 and 17 enables light reflected by the reflecting surface 14 to be transmitted therethrough when the movable portion 120 oscillates. The light passing areas 16 and 17 may be an air gap where any element does not exit, or may include a member that transmits light, such as glass, at at least a part of such an air gap. In one example, the light passing areas 16 and 17 each has a tapered shape in which the width parallel with the E axis increases with an increase in the distance from the E-axis.

The movable device 13 includes, one silicon on insulator (SOI) substrate that is formed by any appropriate treatment method, such as etching. On the formed SOI substrate, the reflecting surface 14, the drive beam 130, and the electrode connection portion 150 are formed, which constitutes a single integrated unit of the above-described components. The above-described multiple components may be formed after the SOI substrate is molded, or may be formed while the SOI substrate is being molded.

The SOI substrate is a substrate in which, on a first silicon layer formed of single crystal silicon (Si), a silicon oxide layer is formed, and on the silicon oxide layer, a second silicon layer formed of single crystal silicon is further formed. Hereinafter, the first silicon layer is referred to as silicon support layer, and the second silicon layer is referred to as silicon active layer.

The silicon active layer has a smaller thickness in the Z-direction than those in the X-direction and the Y-direction. With such a configuration, any member made of only the silicon active layer is deformed by a force applied by, for example, the piezoelectric actuators 131a to 131d and 132a to 132d.

The SOI substrate does not have to be planar, and may have, for example, a curvature. As long as the substrate can be integrally processed by etching or the like and can be partially elastic, the member used for forming the movable device 13 is not limited to the SOI substrate.

As illustrated in FIG. 3A, in the movable portion 120, an interlayer insulator film 122, the wiring 123, a protection film 124, and the reflecting surface 14 are formed in that order on the +Z surface of the silicon active layer 121. Further, a buried oxide (BOX) layer 125 and a silicon supporting layer 126 are formed in that order on the −Z surface of the silicon active layer 121.

The interlayer insulator film 122 contains silicon oxide, and the wiring 123 contains aluminum (Al). The protection film 124 contains silicon oxide and photosensitive polyimide, and the reflecting surface 14 includes a metal thin film containing aluminum, gold or silver. The material for the protection film 124 is any material that enables visible light to pass therethrough.

The BOX layer 125 contains silicon oxide. The BOX layer 125 and the silicon support layer 126 act as a reinforcing rib to prevent the distortion of the reflecting surface 14 due to the motion.

As illustrated in FIG. 3B, the supporting part 140a includes a silicon oxide layer 162 and a silicon active layer 163 sequentially overlaying the +Z surface of the silicon supporting layer 161.

As illustrated in FIG. 3C, the drive beam 130 (the drive beams 130a and 130b) includes an interlayer insulator film 122, a lower electrode 201, a piezoelectric portion 202, an upper electrode 203, an interlayer insulator film 204, the wiring 123, and a protection film 124, which are formed in that order on the +Z surface of the silicon active layer 121a that serves as an elastic member. The piezoelectric portion 202 constitutes the piezoelectric actuators 131a to 131d and 132a to 132d. The silicon active layer 121a constitutes the beam member 133 of the drive beam 130.

The upper electrode 203 and the lower electrode 201 contain gold (Au) or platinum (Pt). The piezoelectric portion 202 contains lead zirconate titanate (PZT) as piezoelectric material.

As illustrated in FIG. 2, the electrode connection portion 150 is electrically connected by the wiring 123 to the upper electrode 203 and the lower electrode 201 of each of the piezoelectric actuators 131a to 131d and 132a to 132d. The electrode connection portion 150 is electrically connected to the circuit board 180 via the FPC 170. The upper electrode 203 or the lower electrode 201 is directly connected to the electrode connection portion 150. Alternatively, the upper electrode 203 and the lower electrode 201 are connected to each other, to be indirectly connected to the electrode connection portion 150.

In the wiring 123, the GND conducting wire 123b is connected to each of the upper electrodes 203 of the piezoelectric actuators 131a to 131d and 132a to 132d. Moreover, the positive voltage conducting wire 123a is connected to each of the lower electrode 201 of each of the piezoelectric actuators 132d, 132b, 131a, and 131c, transmits a positive voltage thereto, and applies a positive drive voltage thereto. In this case, the positive voltage conducting wire 123a is not connected to the lower electrode 201 of each of the piezoelectric actuators 132c, 132a, 131b, and 131d, and passes through the piezoelectric actuators 132c, 132a, 131b, and 131d.

In contrast, the negative voltage conductor 123c is connected to each of the lower electrodes 201 of the piezoelectric actuators 132c, 132a, 131b, and 131d, and conducts a negative voltage to apply a negative drive voltage thereto. In this case, the negative voltage conducting wire 123c is not coupled to the lower electrode 201 of each of the piezoelectric actuators 132d, 132b, 131a, and 131c, and passes through the piezoelectric actuators 132d, 132b, 131a, and 131c.

In this way, the wiring 123 transmits a voltage input through the electrode connection portion 150 to the piezoelectric actuators 131a to 131d and 132a to 132d, and thus apply a drive voltage to the piezoelectric actuators 131a to 131d and 132a to 132d. Alternatively, the wiring 123 conducts electric currents instead of the voltage.

In this case, in the interlayer insulator film 204 provided with the wire 123, the insulator film may be partly removed or may not be partly provided as an opening at a coupling spot where the upper electrode 203 or the lower electrode 201 and the electrode wiring are coupled. Thus, the drive beams 130a and 130b, and the electrode wiring can be designed with a higher degree of freedom, and furthermore, a short circuiting due to the contact between electrodes can be prevented. The silicon oxide film constituting the interlayer insulator film 204 also serves as an anti-reflection member.

Although this embodiment has illustrated an example in which the piezoelectric portion 202 is formed on a surface (+Z-side surface) of the silicon active layer 121 serving as the elastic member, the piezoelectric portion 202 may be formed on another surface (for example, −Z-side surface) of the elastic member, or on both the surface and the other surface of the elastic member.

The shapes of the components are not limited to the shapes in the embodiment as long as the movable portion 120 is rotatable around the E-axis.

Second Example Configuration

FIG. 4 is a plan view of the second example configuration of the movable device 13 with a both-side-support beam structure that can uniaxially deflect light. FIG. 5 is a cross-sectional view taken along the line Q-Q" in FIG. 4. In FIG. 4, components having the same functions as those of the movable device 13 in FIG. 2 are denoted by the same reference numerals as those in FIG. 2.

As illustrated in FIG. 4, the movable device 13 includes a movable portion 120 and drive beams 110a and 110b. The movable portion 120d includes a base that includes, for example, a silicon active layer, and a reflecting surface 14 on the surface of the base.

The reflecting surface 14 includes a metal thin film containing aluminum, gold, or silver. In some examples, the movable portion 120 has a rib on the −Z surface of the base for reinforcing the reflecting surface 14. The rib includes a silicon support layer and a silicon oxide layer, and serve to prevent distortion of the reflecting surface 14 caused the oscillation of the movable portion 120. The reflecting surface 14 has a circular shape. Alternatively, the reflecting surface has another shape, such as an ellipse or a rectangle.

The drive beam 110a includes a torsion bar 111a and a beam 112a. The torsion bar 111b has one end coupled to the movable portion 120 and the other end coupled to the beam 112a. Both ends of the beam 112a are coupled to the inner edge portion of the supporting part 140a, and the beam 112a is supported by the supporting part 140a. The beam 112a includes piezoelectric actuators 113a.

The drive beam 110b includes a torsion bar 111b and a beam 112b. The torsion bar 111b has one end coupled to the movable portion 120 and the other end coupled to the beam 112b. Both ends of the beam 112b are coupled to the inner edge portion of the supporting part 140b, and the beam 112b is supported by the supporting part 140b. The beam 112b includes piezoelectric actuators 113b.

The torsion bars 111a and 111b each includes a silicon active layer. The piezoelectric actuators 113a and 113b each includes a lower electrode 201, a piezoelectric portion 202, and an upper electrode 203 that are formed in that order on the +Z surface of a silicon active layer 163 that serves as an elastic member (see FIG. 5).

The upper electrode 203 and the lower electrode 201 contains gold (Au) or platinum (Pt). The piezoelectric portion 202 contains, for example, PZT as piezoelectric material.

In the example of FIGS. 4 and 5, the piezoelectric portion 202 is formed on the +Z surface of the silicon active layer 163 serving as the elastic member. In some examples, the piezoelectric portion 202 is formed on another surface (for example, −Z surface) of the elastic member, or on both of the +Z surface and the −Z surface of the of the elastic member. In some other examples, the torsion bars 111a and 111b and the piezoelectric actuators 113a and 113b have a shape with curvature as long as the movable portion 120 is able to oscillate around the E axis.

As illustrated in FIG. 4, an electrode connection portion 150 to which voltage is input from the circuit board 180 is provided on the surface of the supporting part 140b. The electrode connecting portions 150 include a positive electrode connecting part 150a to which a positive voltage is applied, a GND connecting part 150b connected to the GND, and a negative electrode connecting part 150c to which a negative voltage is applied.

The wiring 123 is provided in a region other than the reflecting surface 14 on the surface of the movable portion 120 and also on the +Z surface of the drive beams 110a and 110b to conduct the voltage input through the electrode connecting portion 150. The piezoelectric actuator 113a in the drive beam 110a is electrically connected by the wiring 123 passing the movable portion 120, to the electrode connection portion 150. The wiring 123 conducts the voltage input through the electrode connecting portion 150 to the drive beam 110b, and to the drive beam 110a through the drive beam 110b and the movable portion 120. Such an arrangement of the wiring 123 enables drive voltage input through the electrode connecting portion 150 to be applied to both the drive beams 110a and 110b.

The wires 123 include a positive voltage conducting wire 123a through which a positive voltage signal is transmitted, a GND conducting wire 123b connected to the GND, and a negative voltage conducting wire 123c through which a negative voltage signal is transmitted. The positive voltage conducting wire 123a is connected to the positive electrode connecting part 150a. The GND conducting wire 123b is connected to the GND connecting part 150b. The negative voltage conducting wire 123c is connected to the negative electrode connection part 150c.

The GND conducting wire 123b is connected to the upper electrodes of each of the piezoelectric driving circuits 113a and 113b. Moreover, the positive voltage conducting wire 123a is connected to the lower electrode of each of the piezoelectric actuators 113a and 113b, transmits a positive voltage signal thereto, and applies a positive drive voltage thereto. The negative voltage conducting wire 123c is connected to each of the lower electrodes 201 of the piezoelectric actuators 113a and 113b and conducts a negative voltage to apply a negative drive voltage thereto.

An opening area where the supporting part 140 (the supporting parts 140a and 140b) does not exist is provided at each side of the movable portion 120 along the Y direction. Such an opening area defines light passing areas 16 and 17. The light passing areas 16 and 17 enables light reflected by the reflecting surface 14 to be transmitted therethrough when the movable portion 120 oscillates. The light passing areas 16 and 17 each has a tapered shape in which the width parallel to the E axis increases with an increase in the distance from the E-axis. However, the shapes of the light passing areas 16 and 17 are not limited to the tapered shape.

In this way, the wiring 123 transmit voltage input through the electrode connecting portion 150, and thus apply drive voltage to the piezoelectric actuators 113a and 113b. Alternatively, the wiring 123 conducts electric currents instead of the voltage.

The following describes a configuration of the mount unit 70 with reference to FIG. 6. FIG. 6 is a perspective view of the mount unit 70 according to an embodiment of the present disclosure. As illustrated in FIG. 6, the mount unit 70 includes side wall members 71a and 71b, and a bottom member 72. The mount unit 70 has light passing portions 73 and 74 through which light reflected by the reflecting surface 14 passes.

The side wall member 71a has a bent-shaped cross section that is orthogonal to the Z axis. The side wall member 71a is secured by bonding or the like to the +Z surface of the bottom member 72 that is a plate-shaped member such that the open side of the side wall member 71a faces in the +X direction. Similarly, the side wall member 71b is a member having a bent-shaped cross section that is orthogonal to the Z-axis. The side wall member 71b is secured by bonding or the like to the +Z surface of the bottom member 72 such that the open side of the side wall member 71b faces in the −X direction.

In some examples, the side wall members 71a and 71b, and the bottom member 72 is formed as a single integrated unit. When a metal-based material is used, such a member can be fabricated by, for example, casting, cutting, or metal injection molding. When a resin-based material is used, such a member can be fabricated by, for example, injection molding or using a 3D printer. The supporting parts 140a and 140b are secured by the +Z surfaces of the side wall members 71a and 71b.

The light passing portions 73 and 74 are space formed by arranging the side wall member 71a and the side wall member 71b apart from each other in the X direction. The light passing portion 73 is formed on the −Y side of the mount unit 70, and the light passing portion 74 is formed on the +Y side of the mount unit 70.

Each of the light passing portions 73 and 74 is an air gap where any element does not exit, or includes a member that transmits light, such as glass, at at least a part of such an air gap. In some examples, the light passing portions 73 and 74 each has a tapered shape in which the width along the X axis increases with an increase in the distance from the X axis.

Figure 7:
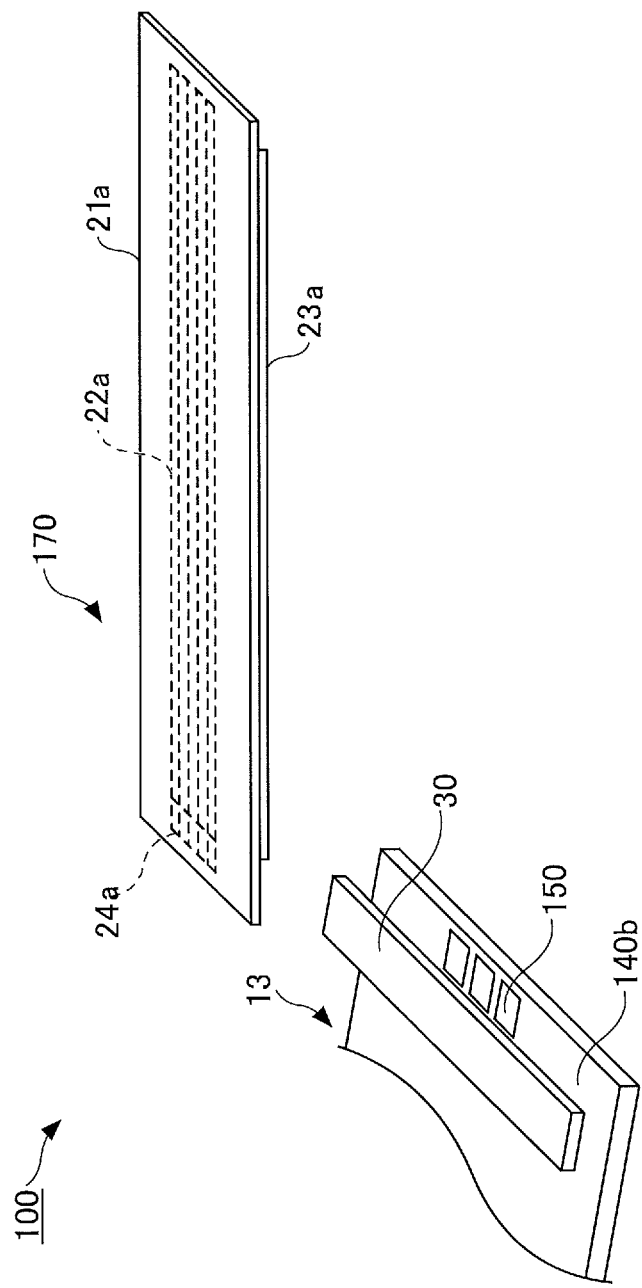
FIG. 7 is an exploded perspective view of a configuration of a connection portion of the movable device and a wiring board, according to an embodiment of the present disclosure.

Next, a configuration of the FPC 170 is described with reference to FIG. 7. FIG. 7 is an exploded perspective view of a connection portion of the movable device 13 and the FPC 170, according to an embodiment.

As illustrated in FIG. 7, the light deflector 100 includes a movable device 13, a FPC 170, and an anisotropic conductive film (ACF) 30. The movable device 13 and the FPC 170 are coupled to each other with the ACF 30 as an example of an anisotropic conductive resin film between the movable device 13 and the FPC 170.

The anisotropic conductive resin film is a film of thermosetting or ultraviolet curable resin inside which multiple conductive particles are dispersed. The anisotropic conductive resin film has electric anisotropy that exhibits conductivity in the thickness direction of the press-fixed portion and an insulating property in the planar direction when the anisotropic conductive resin film is fixed with heat and pressure. Such an anisotropy facilitates both mechanical connection and electric connection. The anisotropic conductive resin film has two types: an ACF and an anisotropic conductive paste (ACP).

The supporting part 140b of the movable device 13 is provided with the electrode connection portion 150 (a land portion) for electrically connecting the movable device 13 to the FPC 170. The FPC 170 includes a base film 21a, multiple conductor wires 22a on the back of the base film 21a, and a cover film 23a covering the conductor wires 22a. The conductor wires 22 has one end uncovered with the cover film 23a and serving as wiring-side electrode portion 24a connected with the electrode connection portion 150 of the movable device 13.

The ACF 30 has a size sufficient to cover the entire electrode connection portion 150 and all of the terminal portions of the FPC 170. This provides a long-term stable conductivity. Further, the ACF 30 having a length equal to or longer than the width of the FPC 170 increase the joint strength.

The electrode connection portion 150 and the wiring-side electrode portion 24a are opposed to each other, and both electrode portions are fixed together with heat and pressure, with the ACF 30 between the electrodes. This enables electrical connection between the movable device 13 and the FPC 170.

The FPC 170 has the other end connected to the electrode of the circuit board 180.

In the present embodiment, the ACF 30, which is a film, is used to connect the movable device 13 to the FPC 170. In some examples, an ACP, which is a paste, is used to connect the movable device 13 to the FPC 170. Using the ACF and the ACP each having electric anisotropy can reduce the distance between the electrodes of the movable device 13, up to, for example, approximately 20 μm. Such a reduction in the distance between the electrodes can reduce the size of each of the movable device 13 and the FPC 170, thus enabling downsizing of the light deflector 100.

As an example of connection method, metal bonding by eutectic bonding of metal or solder bonding is applicable. The metal bonding, which is a bonding between gold and gold, is stable, and enables a desired joint strength at high temperatures, which is advantageous in terms of reliability. The solder bonding enables bonding with temperature, and advantageously has a self-alignment property. As the MEMS device such as the movable device 13 is susceptible to contamination including solder flux and smoke, using the ACF or the ACP is suitable for connecting the movable device 13 with the FPC 170. In addition, the ACF and the ACP, each which have a smaller conductive particle diameter and enable a reduction in the distance between the electrodes, are more suitable. Such a structure enables bonding of the movable device 13 and the FPC 170 with the electrode group arranged on one side of the movable device 13, even with an increase in the number of electrodes to output signals from a detection unit of the movable device 13.

Next, the operation of the movable portion 120 in the movable device 13 is described with reference to FIGS. 8 and 9.

Figure 8:
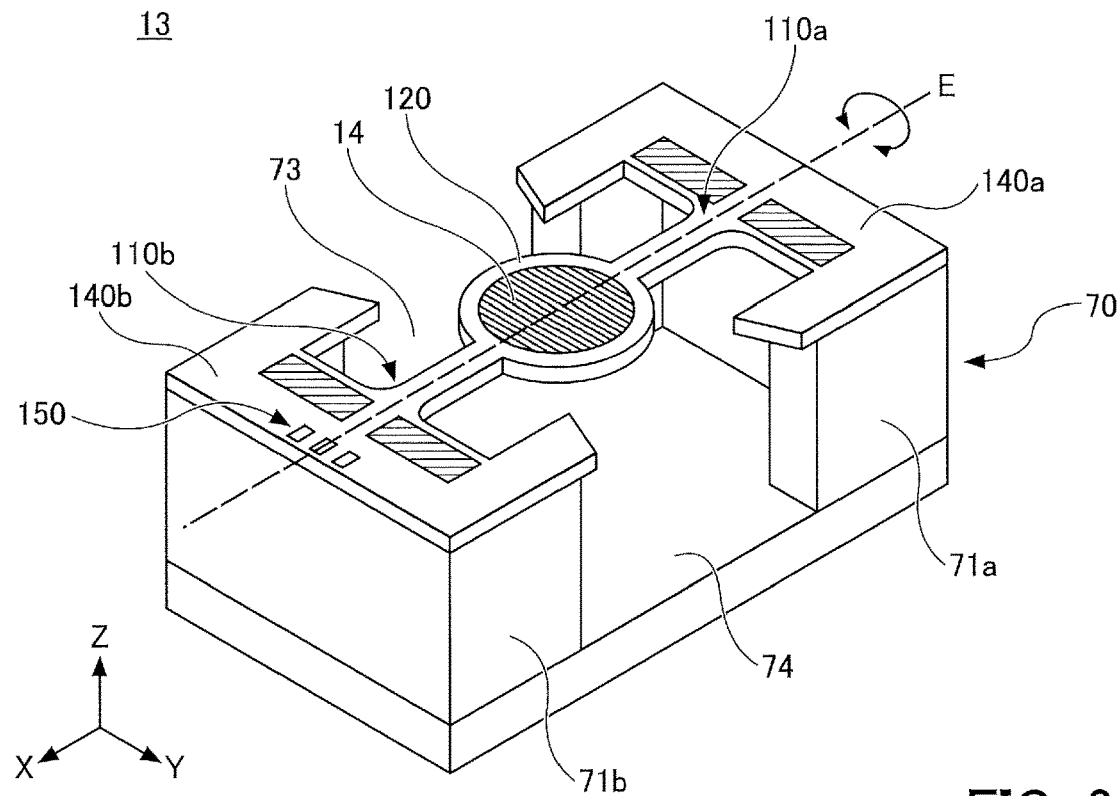
FIG. 8 is a perspective view of a state in which a movable portion is stationary, according to an embodiment of the present disclosure.
Figure 9:
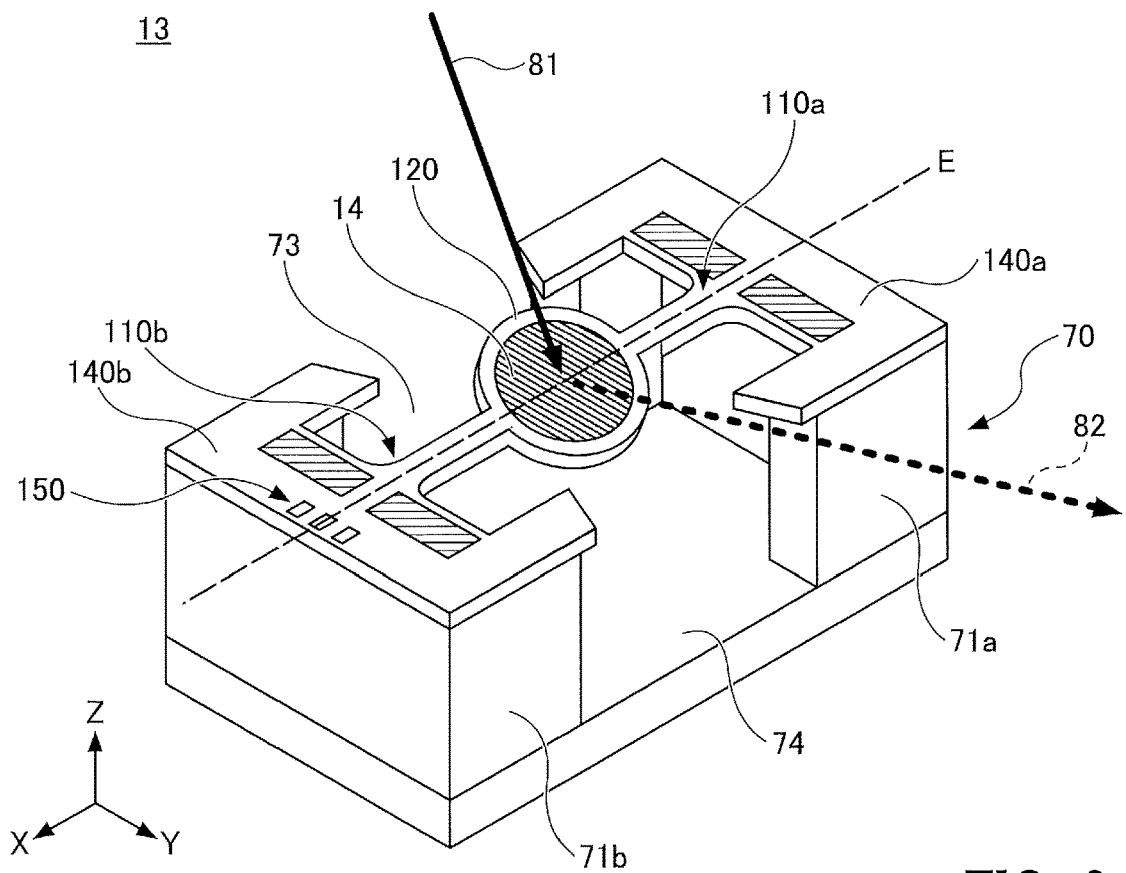
FIG. 9 is a perspective view of a state in which the movable portion oscillates, according to an embodiment of the present disclosure.

FIGS. 8 and 9 are illustrations for describing the operation of the movable portion 120. FIG. 8 is a perspective view a state in which the movable portion 120 is stationary, according to an embodiment of the present disclosure. FIG. 9 is a perspective view of a state in which the movable portion 120 oscillates, according to an embodiment of the present disclosure.

As illustrated in FIGS. 8 and 9, the movable device 13 includes the movable portion 120 having the reflecting surface 14, the pair of drive beams 110a and 110b, the pair of supporting parts 140a and 140b, and the mount unit 70 to which the pair of supporting parts 140a and 140b are secured.

As illustrated in FIG. 8, the reflecting surface 14 is substantially orthogonal to the Z axis when the movable portion 120 is stationary. When the movable portion 120 oscillates around the E axis, the reflecting surface 14 is tilted relative to the Z axis as illustrated in FIG. 9. In FIG. 9, incident light 81 indicated by thick solid-line arrow indicates light incident on the reflecting surface 14, and reflected light 82 indicated by thick broken-line arrow indicates light reflected by the reflecting surface 14 after being incident on the reflecting surface 14 as the incident light 81. The angle at which the incident light 81 is incident on the reflecting surface 14 is predetermined and substantially constant.

When the movable portion 120 oscillates, the tilt of the reflecting surface 14 changes, and the reflection direction of the incident light 81 by the reflecting surface 14 changes. This allows the movable device 13 to deflect the reflected light 82 in the direction (i.e., the Y direction) substantially orthogonal to the E axis, and scan with the reflected light 82 by repeated oscillation.

In the present embodiment, since the light passing portions 73 and 74 are formed on the ±Y sides of the mount unit 70, any member that blocks light reflected by the reflecting surface is not at upstream and downstream areas of the movable portion 120 in the Y direction. This arrangement allows a space through which light reflected by the reflecting surface 14 passes, at downstream and upstream areas of the movable portion 120 in the Y directions. In addition, the supporting parts 140a and 140b are secured to the +Z surfaces of the side wall members 71a and 71b, respectively. This arrangement allows a space through which light reflected by the reflecting surface 14 passes in a predetermined angle range, downstream of the movable portion 120 in the −Z direction.

Further, the arrangement of the mount unit 70 increases the distance in the height direction (i.e., the Z direction) between the movable portion 120 and the circuit board 180 (see FIGS. 1A and 1B) downstream of the movable device 13 in the −Z direction. This prevents the movable portion 120 from colliding with the circuit board 180 when the movable portion 120 significantly oscillates.

The width of the light passing portions 73 and 74 in the X direction is wider than the width of the reflecting surface 14 in the X direction to allow the light reflected by the reflecting surface 14 to pass through the light passing portions 73 and 74. Further, in the present embodiment, an example in which a member having a bent shape in cross section is used as the side wall members 71a and 71b has been described. However, no limitation is intended thereby. As long as the light passage portions 73 and 74 are formed, a flat plate member may be used for at least one of the side wall members 71a and 71b.

The operation of the movable device 13 and the effects of the mount unit 70 are the same between the movable device 13 in FIG. 4 and the movable device 13 in FIG. 2.

Next, a process of manufacturing the light deflector 100 is described with reference to FIG. 10 and FIGS. 11A, 11B, 11C, and 11D.

Figure 10:
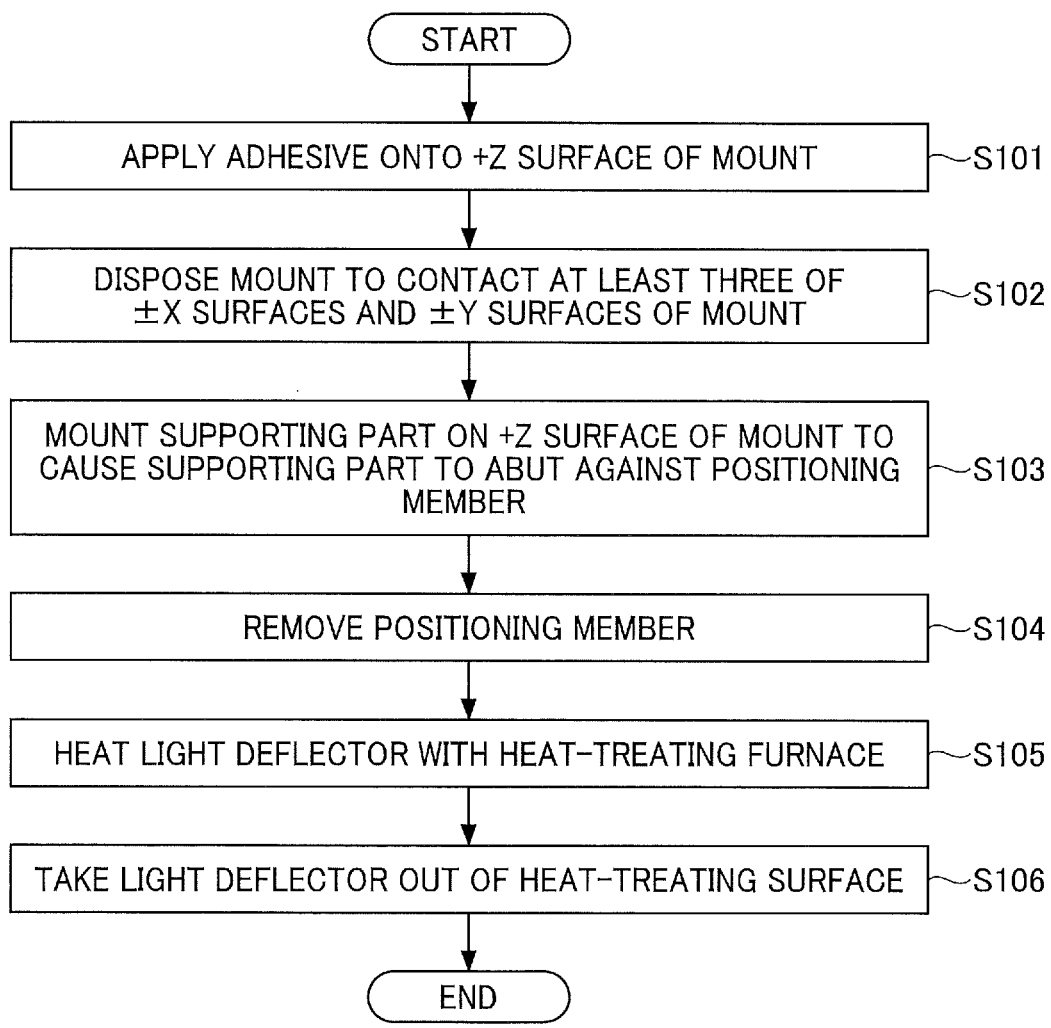
FIG. 10 is a flowchart of a method of manufacturing the light deflector, according to an embodiment of the present disclosure.
Figure 11B:
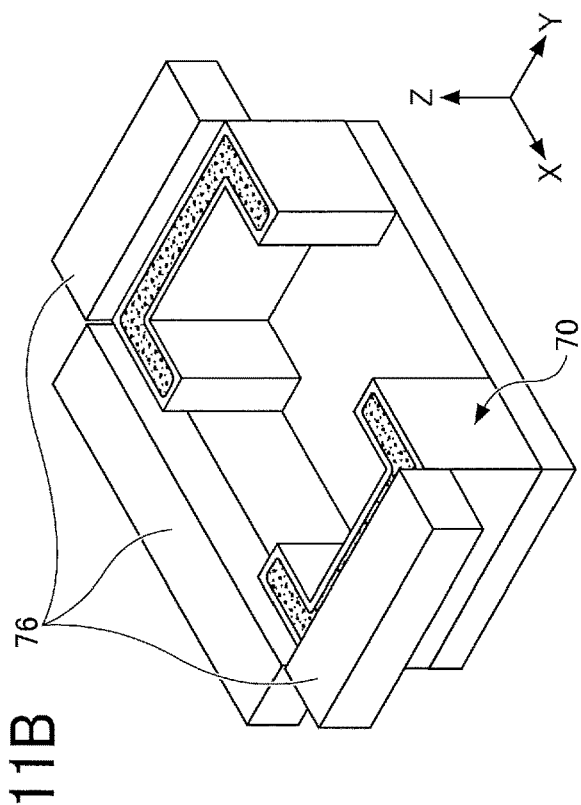
FIG. 11B is a perspective view for describing a process of placing a positioning member in the method of manufacturing the light deflector according to an embodiment of the present disclosure.
Figure 11D:
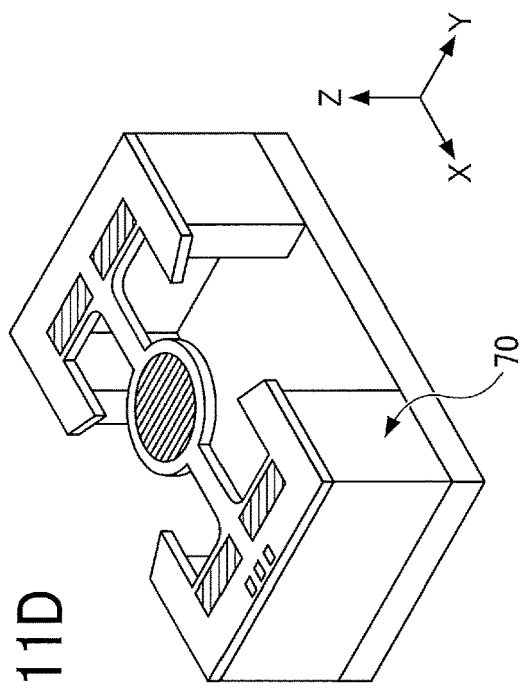
FIG. 11D is an illustration of a resultant product from these processes of the manufacturing method.
Figure 11A:
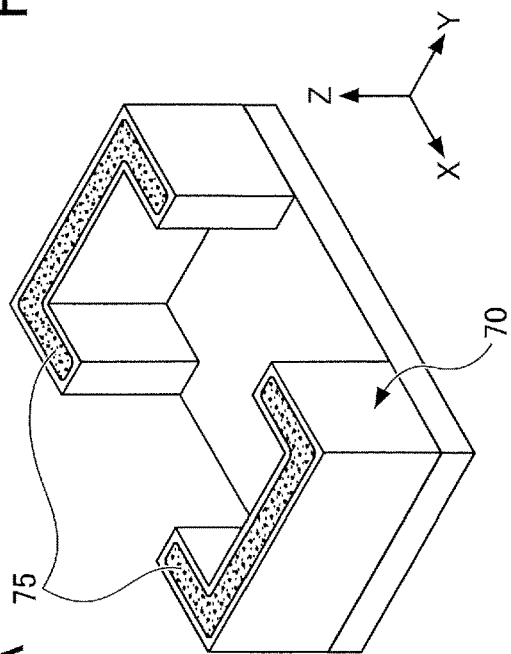
FIG. 11A is a perspective view for describing a process of applying adhesive in the method of manufacturing the light deflector according to an embodiment of the present disclosure.
Figure 11C:
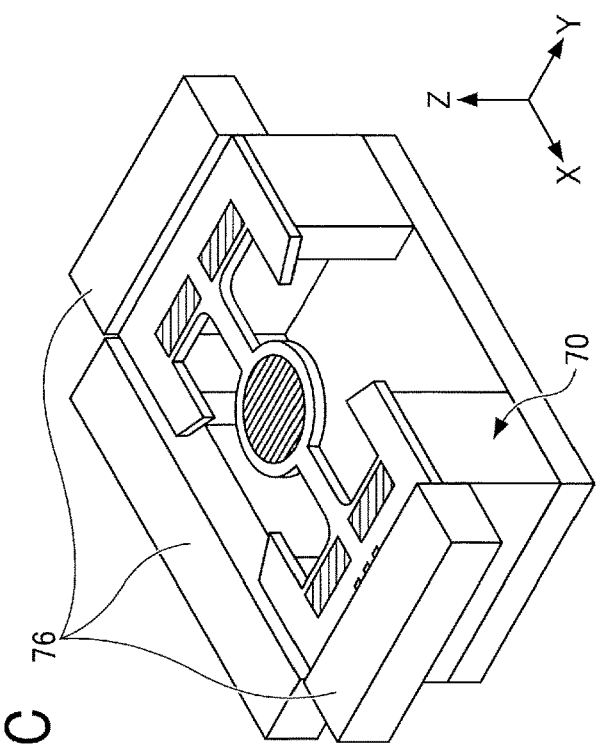
FIG. 11C is an illustration for describing a process of securing a supporting unit to the mount unit.

FIG. 10 is a flowchart of a method of manufacturing the light deflector 100, according to an embodiment of the present disclosure. FIGS. 11A, 11B, 11C, and 11D are perspective views for describing a method for manufacturing a light deflector 100, according to an embodiment. FIG. 11A is an illustration of a process of applying adhesive in the method for manufacturing the light deflector 100 according to an embodiment. FIG. 11B is an illustration of a process of placing a positioning member in the method of manufacturing the light deflector 100 according to an embodiment. FIG. 11C is an illustration of a process of securing the supporting parts 140a and 140b to the mount unit. FIG. 11D is an illustration of a resultant product from these processes of the manufacturing method.

In the examples of FIG. 10 and FIGS. 11A, 11B, 11C, and 11D, it is assumed that the mount unit 70 is assembled, and constituent elements such as the supporting parts 140a and 140b secured to the mount unit 70 are manufactured by etching the SOI substrate.

Referring to FIG. 10, in step S101, an adhesive 75 is applied to the +Z surface of the mount unit 70 (i.e., the side wall members 71a and 71b) (see FIG. 11A). Examples of the adhesive 75 include conductive metal paste such as silver paste; and a thermosetting adhesive, such as an epoxy-resin-based adhesive or a silicone-resin-based adhesive. Notably, silicone is a compound obtained by deoxidizing from silicon dioxide and then bonding an organic compound with silicon, and thus having both organic and inorganic characteristics.

Then, in step S102, positioning members 76 are placed to come into contact with at least three surfaces of the ±X surfaces and the ±Y surfaces of the mount unit 70. In this case, as illustrated in FIG. 11B, portions of surfaces of the positioning members 76 along the Z direction are brought into contact with the surfaces of the side wall members 71a and 71b of the mount unit 70, whereas the other portions of the surfaces of the positioning members 76 along the Z direction of the positioning members 76 remain non-contact with the surfaces of the side wall members 71a and 71b of the mount unit 70 so that the outer peripheral surfaces of the supporting part 140 of the movable device 13e can be abutted against the other portions. To adjust the height in the Z direction of the positioning members 76, a block member or the like that determines the height in the Z direction may be prepared, and the positioning member 76 may be placed on the bock member.

In step S103, with the outer peripheral surfaces of the supporting part 140 of the light deflector 100 being abutted against the surfaces of the positioning member 76, the supporting parts 140a and 140b is placed on the +Z surface of the mount unit 70 (see FIG. 11C). Accordingly, the light deflector 100 becomes a temporarily arranged state.

Subsequently, in step S104, the positioning members 76 are removed.

Subsequently, in step S105, the light deflector 100 in the temporarily-arranged state is placed in a heat treatment furnace, and is heated. Accordingly, the supporting parts 140a and 140b are bonded to the +Z surface of the mount unit 70, and is secured.

In step S106, the light deflector 100 is removed from the heat treatment furnace (see FIG. 11D).

The light deflector 100 is thus manufactured. The connection between the movable device 13 and the FPC 170 is achieved by attaching the ACF 30 to the bonding portion between the movable device 13 and the FPC 170 and then applying heat and pressure to the bonding portion. The process of connecting the movable device 13 with the FPC 170 is performed at any timing before step 101, during step 101 to step S106, or after step S106.

The following describes advantageous effects of the light deflector 100.

Notably, in the light deflector such as an MEMS device, an oscillation angle of the movable portion is to be increased to increase the scanning angle of the light reflected by the movable portion. However, if the oscillation angle of the movable portion is increased, and the movable portion significantly oscillates, the movable portion might collides with an element (e.g., a supporting member supporting the light deflector or a circuit board to drive the light deflector) near the movable portion. This might restrict the oscillation angle of the movable portion.

To avoid such a situation, in the present embodiment, the mount unit 70 is disposed between the movable portion 120 and the circuit board 180 to increase a distance h between the movable portion 120 and the circuit board 180 in the Z direction (see FIGS. 1A and 1B). This configuration prevents the movable portion 120 from colliding with the circuit board 180 even with an increase in the oscillation angle of the movable portion 120. As a result, the scanning angle of light by the light deflector 100 can be increased.

Further, if the distance h in the Z direction (i.e., the height direction) between the movable portion and the circuit board is increased, the wire connecting the light deflector and the circuit board might be easily cut off, the junction of the electrodes might easily come off, or the stability of connection might decrease.

In embodiments of the present disclosure, the movable device 13 is connected to the circuit board 180 via the FPC 170, and the electrode connection portion 150 of the movable device 13 is connected to the wiring-side electrode portion 24*a* of the FPC 170 through the ACF 30.

The connection between the movable device 13 and the circuit board 180 with the FPC 170 therebetween enables a stable connection while preventing the cutoff or breakage of the wire, unlike connection using wire bonding or a distribution cable. Further, the connection between the electrode connection portion 150 and the wiring-side electrode portion 24*a* with the ACF 30 therebetween, by fixation with heat and pressure, achieves a high joint strength and a stable connection between the electrodes while preventing contact failure.

The ACF 30 has electric anisotropy that exhibits conductivity in the thickness direction of the press-fixed portion and an insulating property in the planar direction. Using such an ACF having electric anisotropy can reduce the distance between the electrodes of the movable device 13, up to, for example, approximately 20 μm. Such a reduction in the distance between the electrodes can reduce the size of each of the movable device 13 and the FPC 170, thus enabling downsizing of the light deflector 100. Further, since solder is not used, contamination such as solder flux and smoke can be avoided, and the movable device 13, the FPC 170, and the circuit board 180 can be connected in a clean state.

Further, in the present embodiment, the light passing areas 16 and 17 are provided in both areas adjacent to the movable portion 120 in the direction (i.e., the scanning direction of light) orthogonal to the oscillation axis as illustrated in FIG. 2, and the light passing portions 73 and 74 through which light reflected by the reflecting surface passes are provided on the mount unit 70 (see FIG. 8). This configuration eliminates any object that blocks light on both areas adjacent to the movable portion 120 in the scanning direction of light by the movable portion 120. Thus, the scanning angle of light by the light deflector 100 can be increased.

In the present embodiment, the supporting part 140*b*, which is one of the pair of the supporting units, is provided with multiple electrode connection parts (i.e., the electrode connection portion 150). The drive beam 130*a*, which is one of the pair of the drive beams, is connected to the electrode connection portion 150 through the wiring provided in the movable portion 120.

This configuration enables application of voltage to both the drive beams 130*a* and 130*b*, without providing the electrode connection portions in both areas adjacent to the movable portion 120 in the direction (i.e., the Y direction) orthogonal to the oscillation axis. Such a configuration further enables the FPC 170 to be connected with the movable device 13 along the direction orthogonal to the oscillation axis. This prevents the FPC 170 from being arranged within the optical paths of the scanning light being reflected by the movable portion 120, thus preventing the scanning light from being blocked by the FPC 170. Thus, the scanning angle of the light deflector 100 can be increased.

Such an absence of the electrode connection portions at the supporting parts 140*a* and 140*b* prevents upsizing of the structure that electrically connects the movable device 13 with the FPC 170. This further improves the degree of flexibility in layout of the components in the movable device 13, and simplifies the structure of the movable device 13, thus preventing an increase in manufacturing cost.

In the present embodiment, the supporting part 140*b*, which is one of the pair of the supporting parts, is provided with the positive electrode connecting part 150*a*, the GND connecting part 150*b*, and the negative electrode connecting part 150*c*, which are arranged in the direction orthogonal to the oscillation axis. This configuration enables arrangement of multiple electrode connection parts without providing the electrode connection parts in both areas adjacent to the movable portion 120 in the direction orthogonal to the oscillation axis. Such a configuration further enables the FPC 170 to be connected with the movable device 13 along the direction orthogonal to the oscillation axis. This prevents the FPC 170 from being arranged within the optical paths of the scanning light being reflected by the movable portion 120. This prevents the scanning light from being blocked by the FPC 170, and thus achieves an increase in the scanning angle of the light deflector 100.

The positive electrode connecting part 150*a*, the GND connecting part 150*b*, and the negative electrode connecting part 150*c* are arranged along the longitudinal direction (i.e., the Y direction) of the beam member 133. Such a configuration further enables the FPC 170 to be connected with the movable device 13 along the direction orthogonal to the oscillation axis in the movable device having a meandering structure. This prevents the FPC 170 from being arranged within the optical paths of the scanning light being reflected by the movable portion 120. This prevents the scanning light from being blocked by the FPC 170, and thus achieves an increase in the scanning angle of the light deflector 100 with the movable device having a meandering structure.

In the present embodiment, one FPC 170 is used to connect the movable device 13 with the circuit board 180. This configuration enables a simple structure of the light deflector 100 and prevents an increase in manufacturing cost, unlike a configuration using multiple wiring boards.

In the above-described embodiments, the movable device of the both-side support beam type and capable of uniaxially deflecting light is exemplified. Alternatively, a movable device capable of biaxially deflecting light or a cantilevered movable device is applicable to enable a stable connection between the electrodes.

In the configuration in which the electrode connection portion 150 is bonded to the FPC 170 using the anisotropic conductive film (i.e., ACF bonding), a bonding area without the electrode connection portion 150 is larger than the area of the electrode connection portion 150 to increase the bonding strength (i.e., the joint strength). However, when the electrode connection portion 150 is reduced in in size, an area to be electrically connected is reduced, and thus junction resistance might be increased. If the width of the FPC 170 is increased to deal with such an issue, the light deflector 100 might be increased in size or the arrangement of each component of the light deflector 100 might be restricted.

To deal with such issues, the positive electrode connecting part 150*a*, the GND connecting part 150*b*, and the negative electrode connecting part 150*c* of the electrode connection portion 150 each have a rectangular shape in plan view, the ratio of the short side to the long side is 1:1 to 1:2 where the long side is along the extending direction of the FPC 170 extending from one end to the other end. The ratio of the short side to the long side is more preferably 1:1.5.

This configuration allows a low electrical resistance while maintaining an ACF bonding strength more sufficient to achieve intended performance unlike the case where the electrode connection portion 150 is square.

In the FPC 170, stress is concentrated on areas near the endmost electrode connection parts at the ends of the multiple electrode connection parts arranged in the width direction of the FPC 170, because of the springback caused by release of the bonding pressure after bonding the FPC 170 to the electrode connection portion 150 with pressure. The stress concentration might cause the ACF bonding to break.

Figure 12:
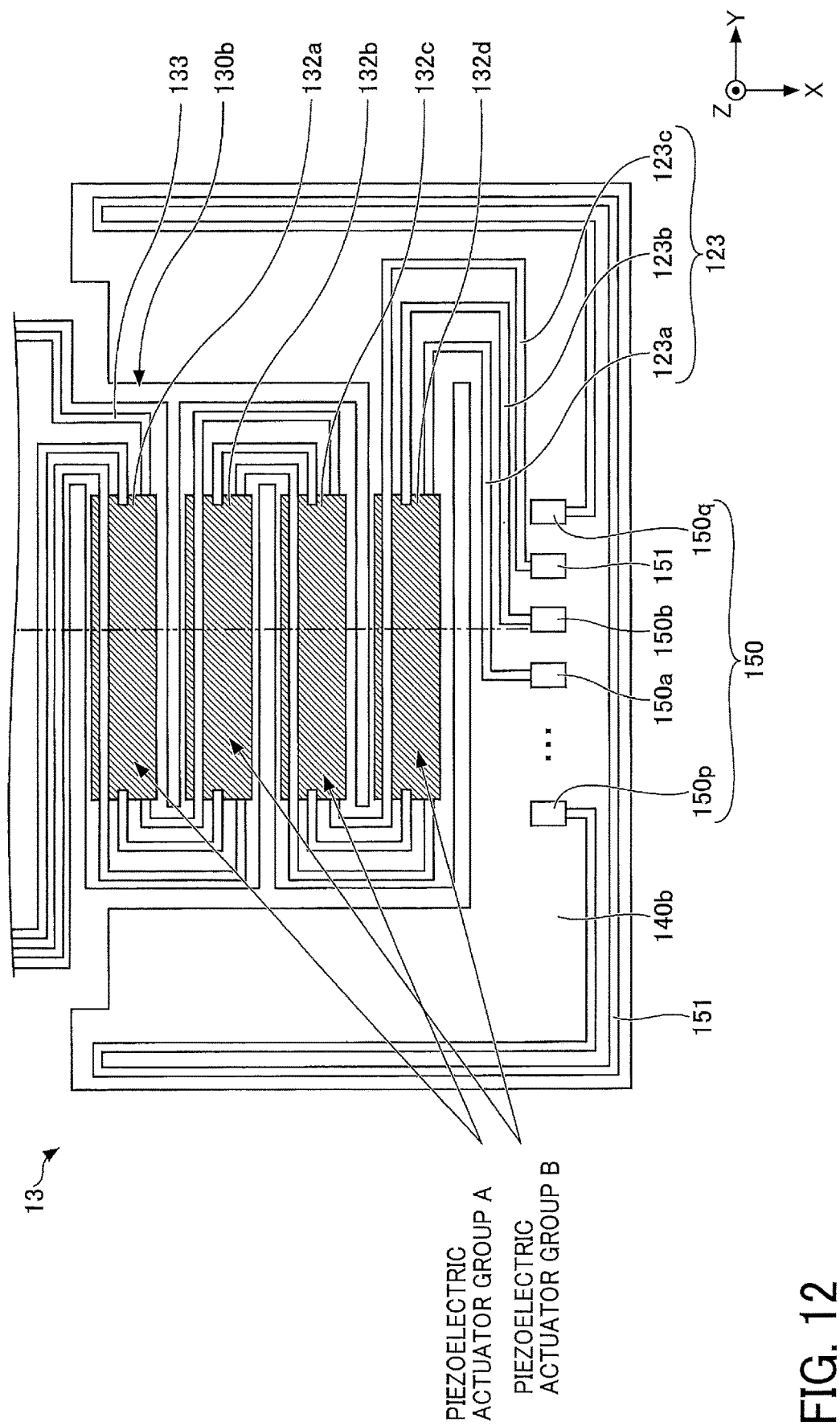
FIG. 12 is a partially enlarged view of the periphery area of an electrode connection portion of the movable device according to an embodiment of the present disclosure.

To avoid such a situation, the endmost electrode connection parts are not connected to the wiring 123. FIG. 12 is an enlarged view of an area in and around the electrode connection portion 150 in the movable device 13. As illustrated in FIG. 12, the electrode connection portion 150 includes multiple electrode connection parts arranged in the Y direction. The multiple electrode connection parts includes an electrode connection part 150p at the −Y end and an electrode connection part 150q at the +Y end of the multiple electrode connection parts. The wiring 123 is not connected to each of the electrode connection parts 150p and 150q.

This configuration provides a higher ACF bonding strength in the endmost areas of the electrode connection portion than the inner area of the electrode connection portion in the FPC 170. This prevents the breakage of the ACF bond and increases the reliability of the drive of the movable device 13. Notably, the wiring 123 includes a conducting wire for transmitting an output voltage of a piezoelectric element provided in the drive beams 110a and 110b for detecting deformation of the drive beams 110a and 110b, in addition to a conducting wire for applying voltage to the piezoelectric actuators 113a and 113b.

Further, in at least one example, the endmost electrode connection parts, which are at the ends of the multiple electrode connection parts, are electrically connected to each other. As illustrated in FIG. 12 for example, the electrode connection part 150p and the electrode connection part 150q are electrically connected by a metal part that contains metal material and serves as a guard ring to form a loop.

This configuration enables determination whether the ACF bonding is poor by checking electrical continuity between the FPC 170 and the electrode connection parts 150p and 150q. When the electrical continuity is faulty, it is determined that the ACF bonding is poor.

As the stress is concentrated on the areas near the end portions (e.g., the electrode connection part 150p and the electrode connection part 150q) of the multiple electrode connection parts (i.e., the electrode connection portion 150) because of the springback, the bonding state becomes unstable, and the ACF bond easily brakes because the FPC 170 is pulled in such end portions (e.g., the electrode connection part 150p and the electrode connection part 150q). For this reason, whether the ACF bond between the FPC 170 and the entire electrode connection portion 150 is poor can be determined by checking the electrical continuity between the electrode connection part 150p and the electrode connection part 150q. In the example of FIG. 12, the electrode connection part 150p and the electrode connection part 150q are connected to each other via the metal part 151. Alternatively, the electrode connection part 150p and the electrode connection part 150q are connected to each other by wiring.

Modification

In the above-described embodiments, the configuration in which the movable device 13 of the light deflector 100 inputs a voltage to the piezoelectric actuators that drive the movable portion 120 is exemplified. Alternatively, the movable device is configured to output voltage output from the piezoelectric actuators and detect an oscillation angle of the movable portion.

Figure 13:
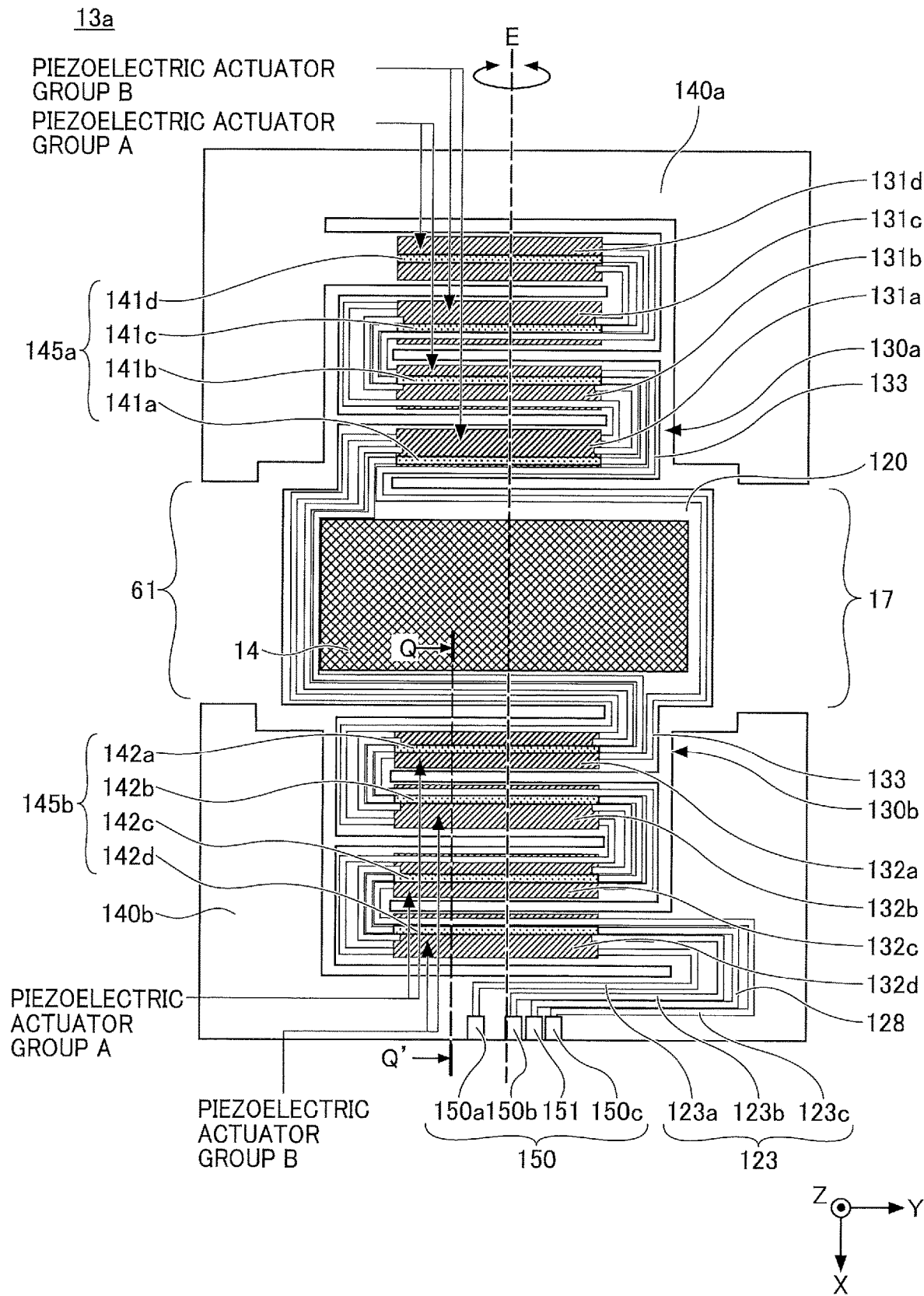
FIG. 13 is a configuration of a movable device according to a modification of an embodiment of the present disclosure.

FIG. 13 is a plan view of a configuration of a movable device 13a according to a modification of an embodiment. Notably, the description of elements similar to those of the movable device 13 in FIG. 2 are omitted.

As illustrated in FIG. 13, the movable device 13a includes detection units 145a and 145b, each of which is an examples of a sensor. The detection unit 145a includes piezoelectric sensors 141a to 141d, and the detection unit 145b includes piezoelectric sensors 142a to 142d. The piezoelectric sensor 141a is provided on the silicon active layer of the piezoelectric actuator 131a, the piezoelectric sensor 141b is provided on the silicon active layer of the piezoelectric actuator 131b. The piezoelectric sensor 141c is provided on the silicon active layer of the piezoelectric actuator 131c, and the piezoelectric sensor 141d is provided on the silicon active layer of the piezoelectric actuator 131d.

Similarly, the piezoelectric sensor 142a is provided on the silicon active layer of the piezoelectric actuator 132a, the piezoelectric sensor 142b is provided on the silicon active layer of the piezoelectric actuator 132b. The piezoelectric sensor 142c is provided on the silicon active layer of the piezoelectric actuator 132c, and the piezoelectric sensor 142d is provided on the silicon active layer of the piezoelectric actuator 132d.

Figure 14:
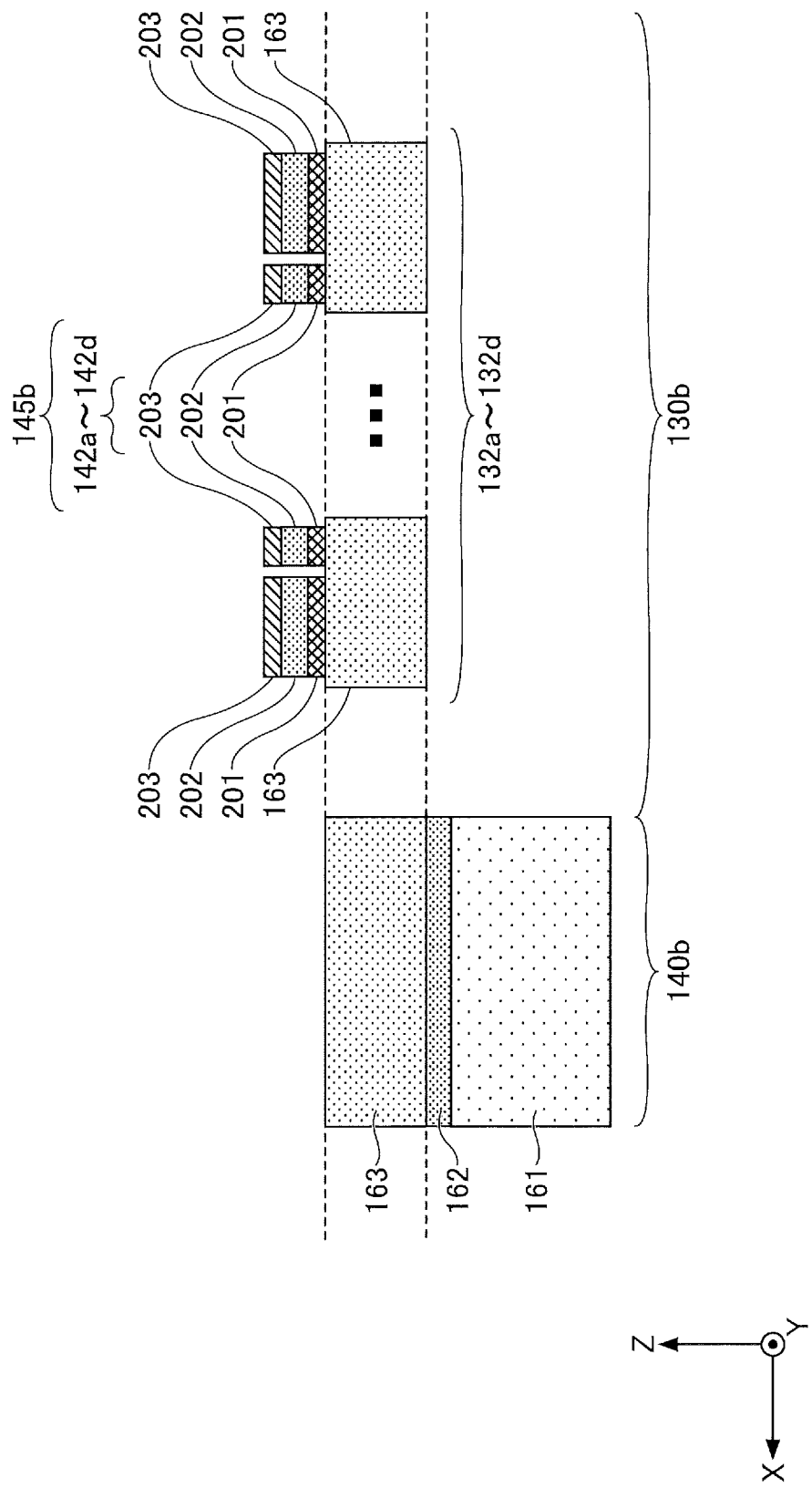
FIG. 14 is a cross-sectional view of the movable device taken along line Q-Q' in FIG. 13.

FIG. 14 is a cross-sectional view of the movable device 13a taken along line Q-Q' in FIG. 12. As illustrated in FIG. 14, in a similar manner to the drive beam 130a, the detection unit 145a includes the silicon active layer 163 supported by the silicon supporting layer 161 via the silicon oxide layer 162; the lower electrode 201; a piezoelectric portion 202; and an upper electrode 203. The lower electrode 201, the piezoelectric portion 202, and the upper electrode 203 are laminated in this order on the +Z surface of the silicon active layer 163 that serves as an elastic member. For example, each of the upper electrode 203 and the lower electrode 201 contains gold (Au) or platinum (Pt). For example, the piezoelectric portion 202 contains lead zirconate titanate (PZT) as a piezoelectric material.

The detection unit 145b is formed such that each of the piezoelectric sensors 142a to 142d has a length substantially equal to the length of each of the piezoelectric actuators 132a to 132d in the Y direction and has a narrower width than the width of the piezoelectric actuators 132a to 132d in the X direction. With this configuration of the detection unit 145b in which each of the piezoelectric sensors 142a to 142d has a length substantially equal to the length of each of the piezoelectric actuators 132a to 132d in the Y direction, the oscillation frequency signal can be accurately detected. Further, with such a configuration in which each of the piezoelectric sensors 142a to 142d has a narrower width than the width of the piezoelectric actuators 132a to 132d in the X direction of the detection unit 145b, the oscillation force of the piezoelectric actuators 132a to 132d can be increased. Notably, in some examples, the length of the detection unit 145b is not substantially equal to the length of the piezoelectric actuators 132a to 132d in the Y direction and is shorter than the length of the piezoelectric actuators 132a to 132d. In this case, more beam members are provided with the piezoelectric actuators 132a to 132d by such a reduction in the length of the detection unit 145b, and more oscillation force of the piezoelectric actuators 132a to 132d can be obtained.

Further, the piezoelectric sensors 142a to 142d of the detection unit 145b are disposed on the +Z surface of the silicon active layer of the piezoelectric actuators 132a to 132d such that the piezoelectric sensors 142a to 142d are spaced apart to not contact the piezoelectric actuators 132a to 132d of the drive beam 130b. The detection unit 145b has the same structure as that of the detection unit 145a.

The piezoelectric actuator groups A and B are bent and deformed when the drive voltage is applied to the drive beams 130*a* and 130*b*. Each of the detection units 145*a* and 145*b* detects, as a deflection-angle frequency signal representing information about the deflection angle of the reflector, a voltage or information based on the voltage generated by the piezoelectric portion 202 as a result of the deformation of the silicon active layer 163 caused by the drive beams 130*a* and 130*b*, and outputs the signal to the control device 11*a*. Then, each of the detection units 145*a* and 145*b* outputs the detected voltage or information to a detection unit (another example of a sensor) of the circuit board 180 (see FIGS. 1A and 1B) through the electrode connection portion 150 as an output part and an output wiring board corresponding to the FPC 170 in FIGS. 1A and 1B.

In such a configuration, the same configuration as in the above-described embodiment is applicable to achieve connection between the output wiring board and the electrode so as to supply the detected signal to the circuit board 180.

The light deflector 100 according to the above-described embodiment can be applied to various systems and apparatuses. Hereinafter, application examples of the light deflector 100 to various systems and apparatuses are described.

With initially reference to FIGS. 15 to 18, an optical scanning system to which a light deflector 100 according to an embodiment of the present disclosure is applied is described below in detail.

Figure 15:
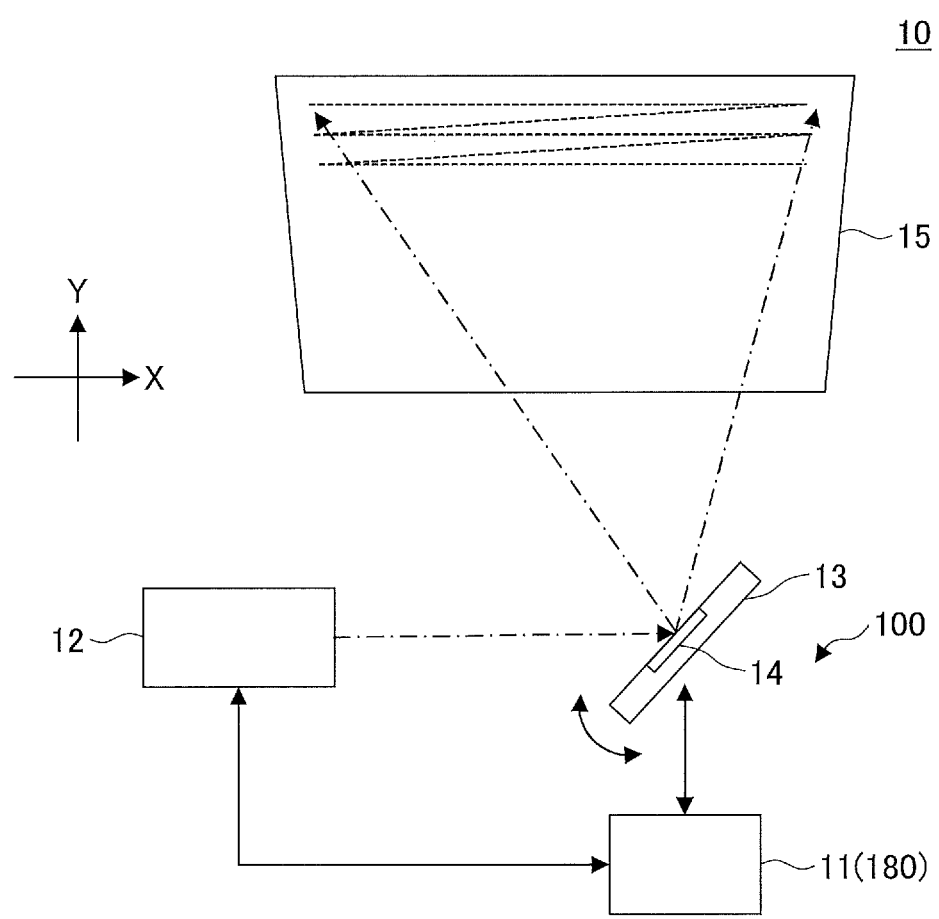
FIG. 15 is a schematic view of an optical scanning system according to an embodiment of the present disclosure.

FIG. 15 is a schematic view of an example of an optical scanning system 10. As illustrated in FIG. 15, the optical scanning system 10 deflects light emitted from a light-source device 12 under the control of a control device 11, by using a reflecting surface 14 included in the movable device 13, so as to optically scan a target surface 15 to be scanned (hereinafter, referred to as target surface).

The optical scanning system 10 includes the control device 11, the light-source device 12, and the movable device 13 including the reflecting surface 14.

For example, the control device 11, which is an electronic circuit unit provided with a central processing unit (CPU) and a field-programmable gate array (FPGA), is mounted on a circuit board 180 of the light deflector 100. For example, the movable device 13 is provided with a reflecting surface 14, and the movable device 13 serves as a micro-electromechanical system (MEMS) that is capable of moving the reflecting surface 14. The light-source device 12 is, for example, a laser device that emits a laser beam. The surface 15 to be scanned is, for example, a screen.

The control device 11 generates control instructions of the light-source device 12 and the movable device 13 using acquired optical-scanning information, and outputs drive signals to the light-source device 12 and the movable device 13 in accordance with the control instructions.

The light-source device 12 emits light in accordance with the received drive signal. The movable device 13 moves the reflecting surface 14 in at least one of a uniaxial direction and a biaxial direction, in accordance with the received drive signal.

With this configuration, for example, the reflecting surface 14 of the movable device 13 is biaxially moved in a reciprocating manner within a predetermined range, and the light emitted from the light-source device 12 to be incident on the reflecting surface 14 is uniaxially deflected to perform optical scanning, under the control of the control device 11, which is based on image data that is an example of the optical-scanning information. Accordingly, an image can be projected onto the target surface 15 as desired. The details of the movable device and the details of the control of the control device according to the embodiment are described later.

Figure 16:
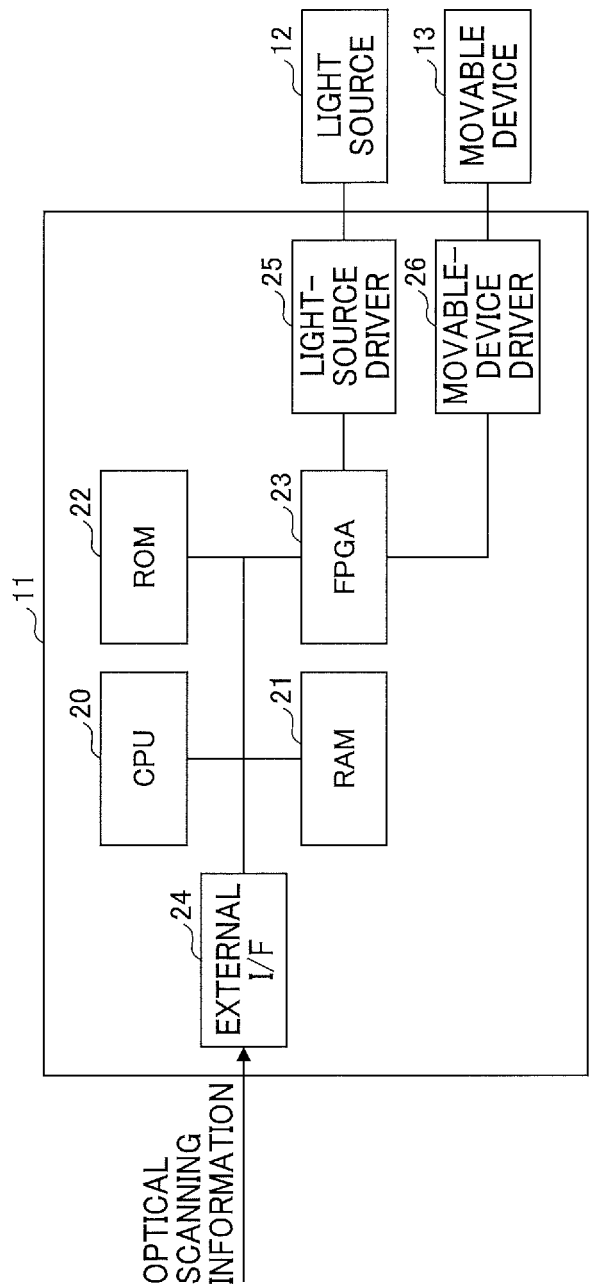
FIG. 16 is a hardware block diagram of the optical scanning system in FIG. 15.

Next, the hardware configuration of an example of the optical scanning system 10 is described referring to FIG. 16. FIG. 16 is a hardware block diagram of an example of the optical scanning system. As illustrated in FIG. 16, the optical scanning system 10 includes the control device 11, the light-source device 12, and the movable device 13, which are electrically connected to one another. The control device 11 includes a central processing unit (CPU) 20, a random access memory (RAM) 21, a read only memory (ROM) 22, a field-programmable gate array (FPGA) 23, an external interface (I/F) 24, a light-source driver 25, and a movable-device driver 26.

The CPU 20 is an arithmetic device that loads into the RAM 21 a program or data from a storage device such as the ROM 22 and executes processing to control the entirety of the control device 11.

The RAM 21 is a volatile storage device that temporarily stores a program and data.

The ROM 22 is a non-volatile storage device that stores a program or data even after the power is turned off, and stores a program or data for processing that is executed by the CPU 20 to control each function of the optical scanning system 10.

The FPGA 23 is a circuit that outputs proper control signals to the light-source driver 25 and the movable-device driver 26 in accordance with the processing performed by the CPU 20.

For example, the external I/F 24 is an interface with respect to an external device or a network. The external device includes, for example, a host device such as a PC (Personal Computer), and a storage device such as a USB memory, an SD card, a CD, a DVD, an HDD, and an SSD. For example, the network may be a controller area network (CAN) of a vehicle, a local area network (LAN), and the Internet. The external I/F 24 can have any configuration that can achieve connection to an external device or communication with an external device. The external I/F 24 may be provided for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the control device 11, the CPU 20 acquires optical-scanning information from an external device or the network through the external I/F 24. The CPU 20 may have any configuration that acquires optical scanning information. In some examples, the optical scanning information may be stored in the ROM 22 or in the FPGA 23 of the control device 11. In some other examples, a storage device such as a solid state disk (SSD) may be additionally provided in the control device 11 and the optical scanning information may be stored in the storage device.

In this case, the optical-scanning information indicates how the surface 15 is to be optically scanned. In another example, the optical-scanning information is image data used for optical scanning to display an image. For another example, the optical-scanning information is writing data indicating the order and portion of writing when optical writing is performed by optical scanning. For further example, the optical-scanning information is irradiation data indicating the timing and range of irradiation with light for distance measurement when distance measurement is performed by optical scanning.

The control device 11 has the hardware configuration in FIG. 16, and the components of the hardware configuration operate in accordance with instructions from the CPU 20 to implement the capabilities of the functional configuration as described below.

Figure 17:
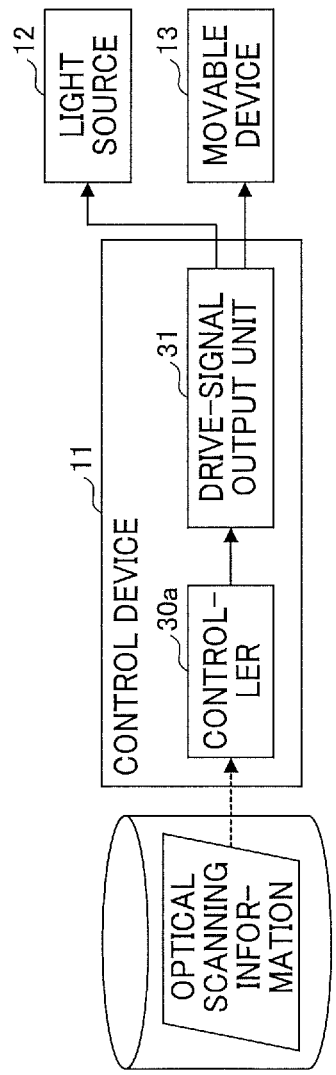
FIG. 17 is a functional block diagram of a control device according to an embodiment of the present disclosure.

Next, the functional configuration of the control device 11 of the optical scanning system 10 is described below referring to FIG. 17. FIG. 17 is a functional block diagram of the control device 11 of the optical scanning system 10, according to an embodiment of the present disclosure.

As illustrated in FIG. 17, the control device 11 has the functions of a controller 30a and a driving-signal output unit 31.

The controller 30a is implemented by, for example, the CPU 20 and the FPGA 23. The controller 30a acquires optical-scanning information from an external device, converts the optical-scanning information into a control signal, and outputs the control signal to the drive-signal output unit 31. For example, the controller 30a acquires image data serving as the optical-scanning information from an external device or the like, generates a control signal from the image data through predetermined processing, and outputs the control signal to the drive-signal output unit 31.

The drive-signal output unit 31 is implemented by, for example, the light-source driver 25 and the movable-device driver 26. The drive-signal output unit 31 outputs a drive signal to the light-source device 12 or the movable device 13 in accordance with the received control signal.

The drive signal is a signal for controlling the driving of the light-source device 12 or the movable device 13. For example, the drive signal of the light-source device 12 is a drive voltage used to control the irradiation timing and irradiation intensity of the light source. Moreover, for example, the drive signal in the movable device 13 is a drive voltage used to control the timing and range of motion where the reflecting surface 14 provided in the movable device 13 is moved.

Figure 18:
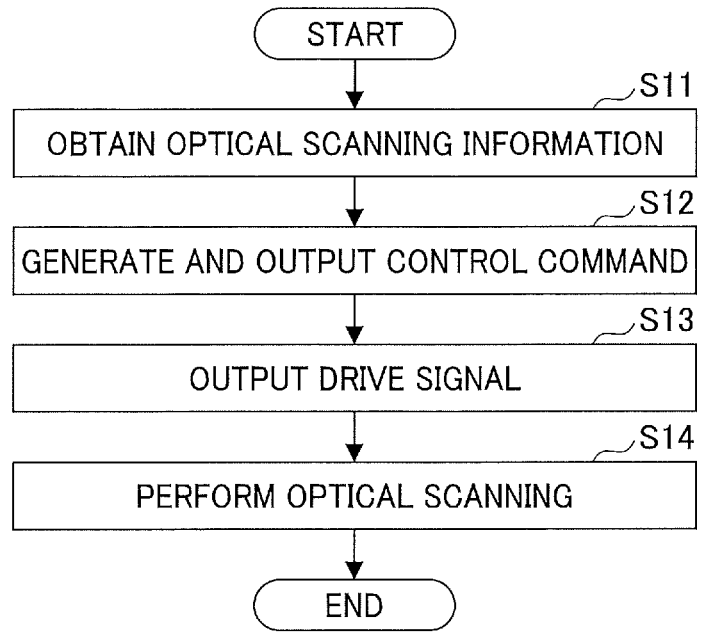
FIG. 18 is a flowchart of processing involved in the optical scanning system, according to an embodiment of the present disclosure.

Next, the process of optically scanning the target surface 15 performed by the optical scanning system 10 is described referring to FIG. 18. FIG. 18 is a flowchart of an example of processing performed by the optical scanning system 10.

In step S11, the controller 30a acquires optical-scanning information from, for example, an external device.

In step S12, the controller 30a generates control signals from the acquired optical-scanning information, and outputs the control signals to the drive-signal output unit 31.

In step S13, the drive-signal output unit 31 outputs drive signals to the light-source device 12 and the movable device 13 based on the received control signals.

In step S14, the light-source device 12 emits light based on the received drive signal. In addition, the movable device 13 moves the reflecting surface 14 based on the received drive signal. The driving of the light-source device 12 and the movable device 13 causes light to be deflected in a given direction, and optical scanning is performed.

In the above-described optical scanning system 10, a single control device 11 has a device and a function for controlling the light-source device 12 and the movable device 13. However, a control device for the light-source device and a control device for the movable device may be separate elements.

In the above-described optical scanning system 10, a single control device 11 has the functions of the controller 30a and the functions of the drive-signal output unit 31 for the light-source device 12 and the movable device 13. These functions may be implemented by separate elements. For example, a drive-signal output device including a drive-signal output unit 31 may be provided in addition to the control device 11 including the controller 30a. An optical deflection system that performs optical deflection may be configured by the control device 11 and the movable device 13 provided with the reflecting surface 14, which are elements of the above optical scanning system 10.

As described above, applying the light deflector 100 according to an embodiment to an optical scanning system provides an optical scanning system that allows a stable connection between the movable device and the drive unit.

An image projection apparatus, to which the movable device according to the embodiment is applied, is described next in detail referring to FIGS. 19 and 20.

Figure 19:
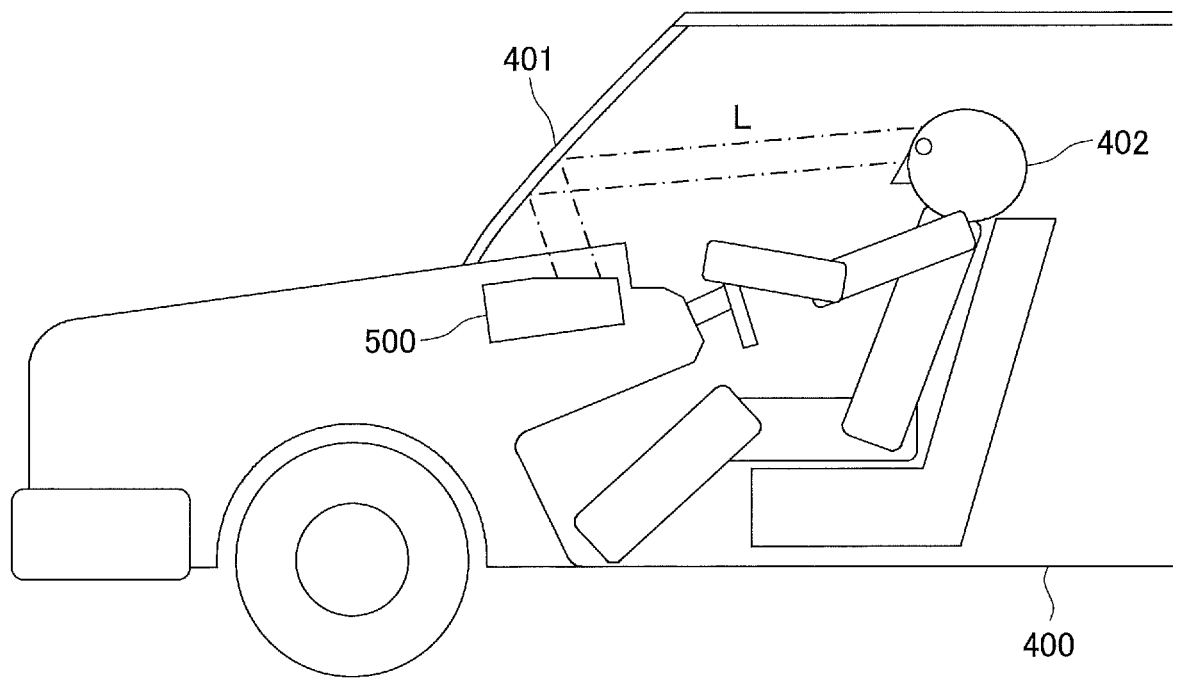
FIG. 19 is a schematic view of an example of a vehicle equipped with a head-up display device (HUD)

FIG. 19 is a schematic view of a vehicle 400 equipped with a HUD 500 as an example of a projection device according to an embodiment. FIG. 20 is a schematic view of the HUD 500 according to an embodiment of the present disclosure.

The image projection apparatus is an apparatus that projects an image by optical scanning, and is, for example, a HUD.

As illustrated in FIG. 19, for example, the HUD 500 is provided near a front windshield such as a windshield 401 of the vehicle 400. Projection light L that is emitted from the HUD 500 is reflected by the windshield 401 and directed to a viewer (a driver 402) as a user. Accordingly, the driver 402 can visually recognize as a virtual image an image projected by the HUD 500. Alternatively, a combiner may be disposed on the inner wall surface of the windshield 401 so that the user can visually recognize a virtual image formed by the projection light that is reflected by the combiner.

Figure 20:
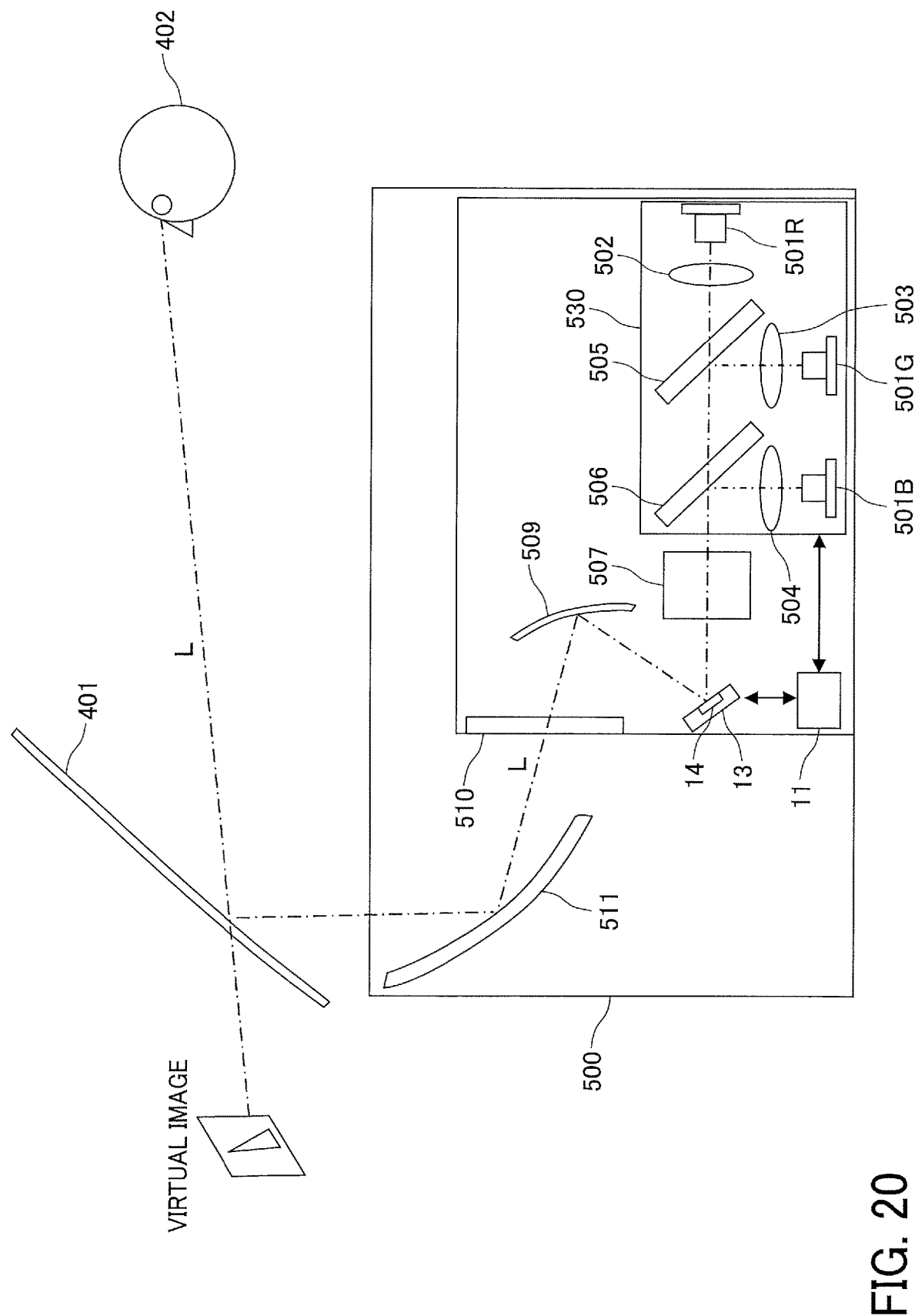
FIG. 20 is a schematic view of a HUD according to an embodiment of the present disclosure.

As illustrated in FIG. 20, the head-up display 500 emits laser beams from red, green, and blue laser-beam sources 501R, 501G, and 501B, respectively. The emitted laser beams pass through an incident optical system, and then are deflected by the movable device 13 including the reflecting surface 14. The incident optical system includes collimator lenses 502, 503, and 504, respectively provided for the laser-beam sources 501R, 501G, and 501B, two dichroic mirrors 505 and 506, and a light-intensity adjuster 507. The deflected laser beams pass through a projection optical system and are projected onto a screen. The projection optical system includes a free-form surface mirror 509, an intermediate screen 510, and a projection mirror 511. In the HUD 500, the laser-beam sources 501R, 501G, 501B, the collimator lenses 502, 503, 504, and the dichroic mirrors 505, 506 are combined as a single unit that is an optical housing serving as a light source unit 530 (a light source of the HUD 500).

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser-beam sources 501R, 501G, and 501B are approximately collimated by the collimator lens 502, 503, and 504, and are combined by the two dichroic mirrors 505 and 506. The light intensity of the combined laser beams is adjusted by the light-intensity adjuster 507, and then two-dimensional scanning is performed by the movable device 13 provided with the reflecting surface 14. The light L being deflected for two-dimensional scanning by the movable device 13 is reflected by the free-form surface mirror 509 and has its distortion corrected, thus being condensed on the intermediate screen 510. The intermediate screen 510 includes a microlens array in which multiple microlenses are two-dimensionally arranged, and enlarges the projection light L incident on the intermediate screen 510 in units of microlens.

The movable device 13 moves the reflecting surface 14 biaxially in a reciprocating manner to perform two-dimensional scanning with the projection light L incident on the reflecting surface 14. The driving of the movable device 13 is controlled in synchronization with the light-emitting timings of the laser-beam sources 501R, 501G, and 501B.

In the above description, the head-up display 500 is described as an example of the projection apparatus. However, no limitation is indicated thereby, and the projection apparatus may be any apparatus that performs optical scanning, using the movable device 13 provided with the reflecting surface 14, to project an image. For example, the present disclosure is also applicable to a projector that is placed on a desk or the like and projects an image on a display screen, a head-mounted display device that is incorporated in a wearable member on the head of the observer, for example, and that projects an image on a reflective-and-transmissive screen of the wearable member or on an eyeball as a screen, and the like.

The projection device may be incorporated in, not only the vehicle or the wearable member, but also, for example, a mobile object such as an aircraft, a ship, or a mobile robot; or an immobile object such as an operation robot that operates a driving target such as a manipulator without moving from the installed location.

As described above, applying the light deflector according to an embodiment to a projection device provides a projection device that allows a stable connection between the movable device and the drive unit.

Next, an optical writing device to which the movable device 13 according to an embodiment of the present disclosure is applied is described in detail with reference to FIGS. 21 and 22.

Figure 21:
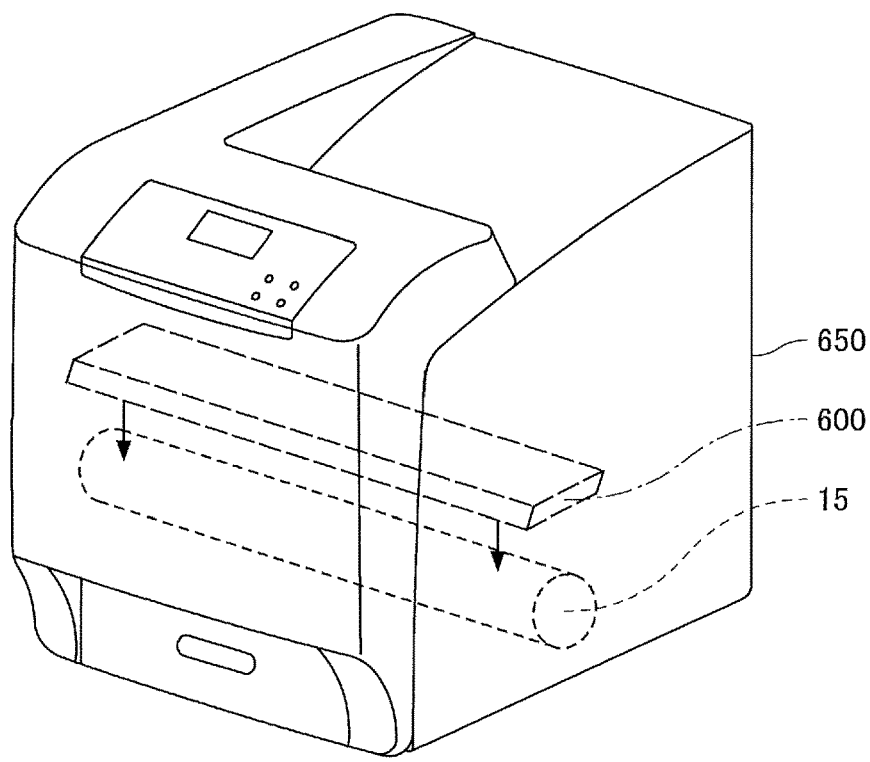
FIG. 21 is a schematic view of an example of an image forming apparatus equipped with an optical writing device.

FIG. 21 is an illustration of an example of an image forming apparatus equipped with the optical writing device 600. FIG. 22 is a schematic view of an example of the optical writing device 600.

As illustrated in FIG. 21, the optical writing device 600 is used as a component of an image forming apparatus typified by a laser printer 650, for example, having printer functions using laser beams. In the image forming apparatus, the optical writing device 600 performs optical scanning on a photoconductor drum, which is the target surface 15, by using one or more laser beams, thereby performing optical writing on the photoconductor drum.

Figure 22:
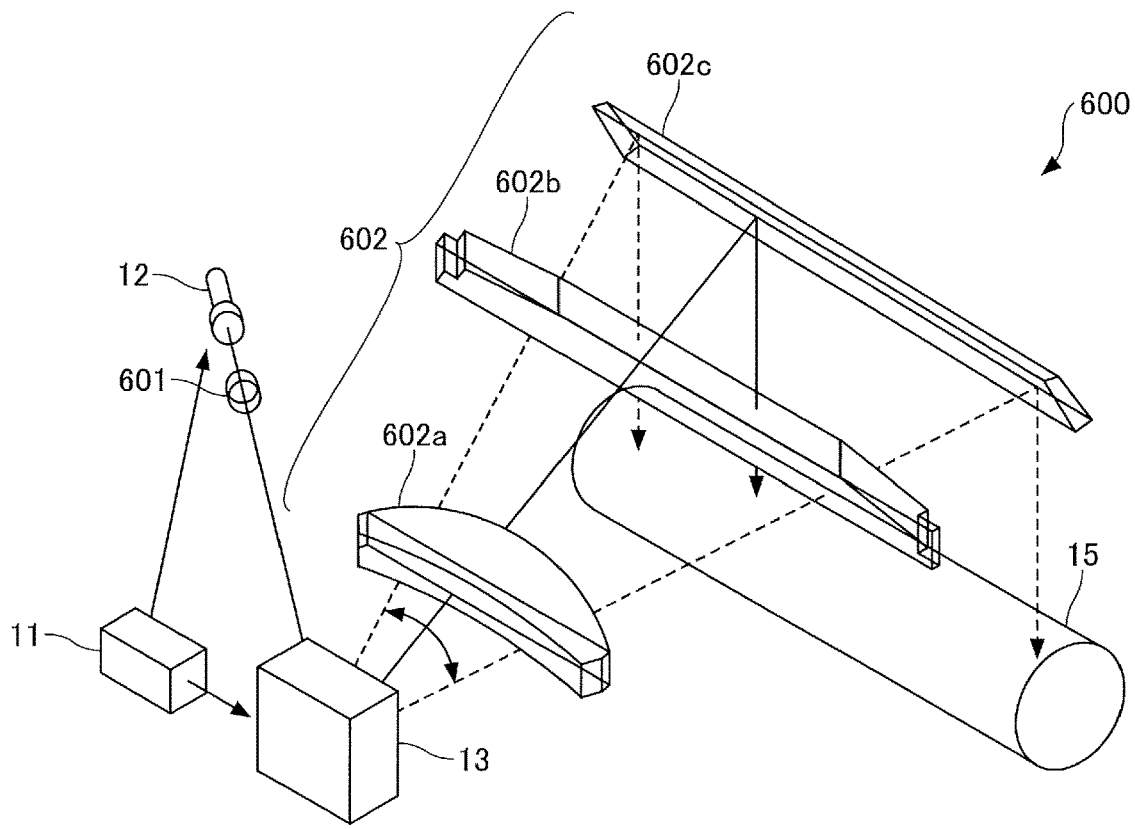
FIG. 22 is a schematic view of an example of the optical writing device.

As illustrated in FIG. 22, in the optical writing device 600, a laser beam from the light-source device 12 such as a laser element passes through an image forming optical system 601 such as a collimator lens and is then deflected uniaxially or biaxially by the movable device 13 having the reflecting surface 14. The laser beam deflected by the movable device 13 passes through a scanning optical system 602 constituted by a first lens 602a, a second lens 602b, and a reflecting mirror unit 602c, and is emitted onto the target surface 15 (e.g., a photoconductor drum or photosensitive paper), and thereby optical writing is performed. The scanning optical system 602 forms a laser beam in the form of a spot on the target surface 15. The light-source device 12 and the movable device 13 including the reflecting surface 14 are controlled by the control device 11.

As described above, the optical writing device 600 can be used as a component of the image forming apparatus having a printer function using laser beams. Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating.

The movable device 13 including the reflecting surface 14 to be applied to the optical writing device saves power of the optical writing device because power consumption for driving the movable device 13 is less than that for driving a rotational polygon mirror. The movable device 13 makes a smaller wind noise when the reflector base oscillates compared with a rotational polygon mirror, and thus is advantageous in achieving low noise of the optical writing device. The optical writing device requires much smaller installation space than the installation space of a rotational polygon mirror, and the amount of heat generated by the movable device 13 is small. Accordingly, downsizing is easily achieved, and thus the optical writing device is advantageous in downsizing the image forming apparatus.

As described above, applying the light deflector according to an embodiment to a writing device provides a writing device that allows a stable connection between the movable device and the drive unit.

Figure 23:
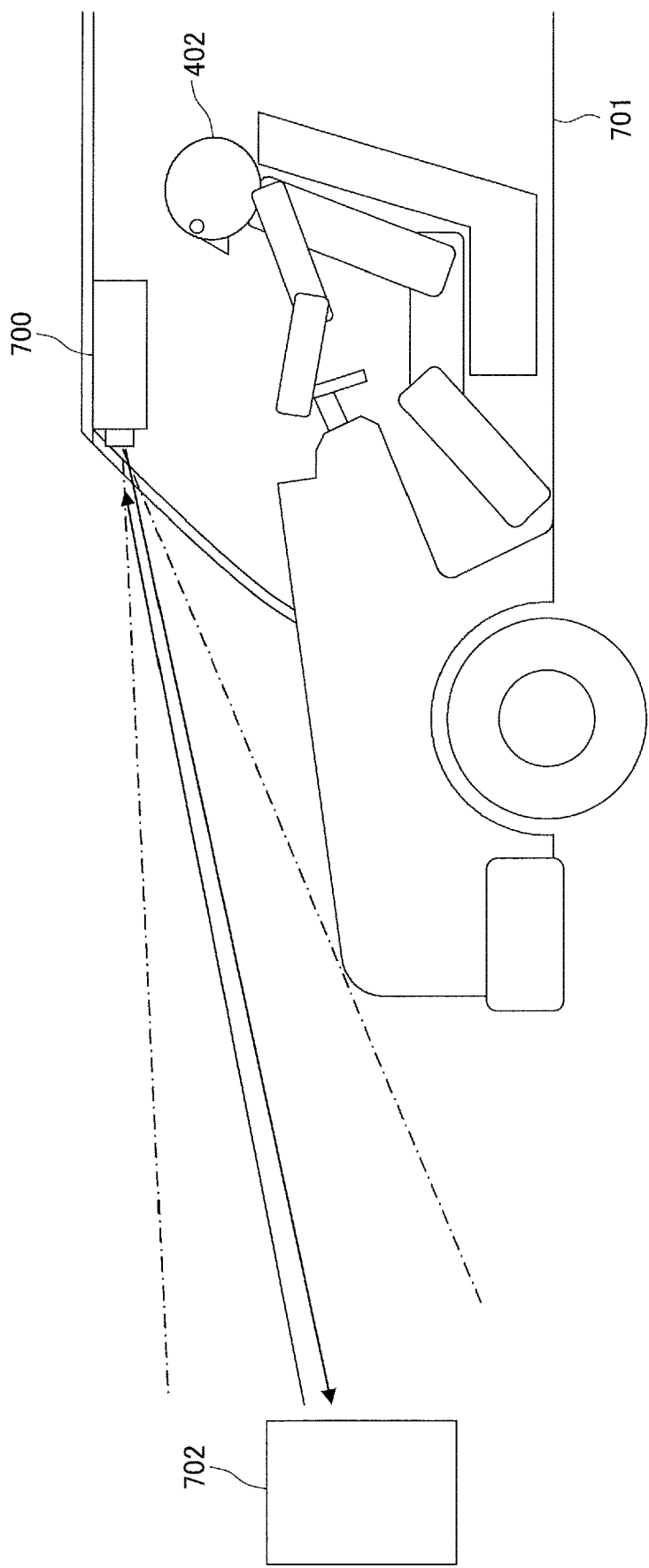
FIG. 23 is a schematic view of a vehicle equipped with a laser imaging detection and ranging (LiDAR) device, according to an embodiment of the present disclosure.
Figure 24:
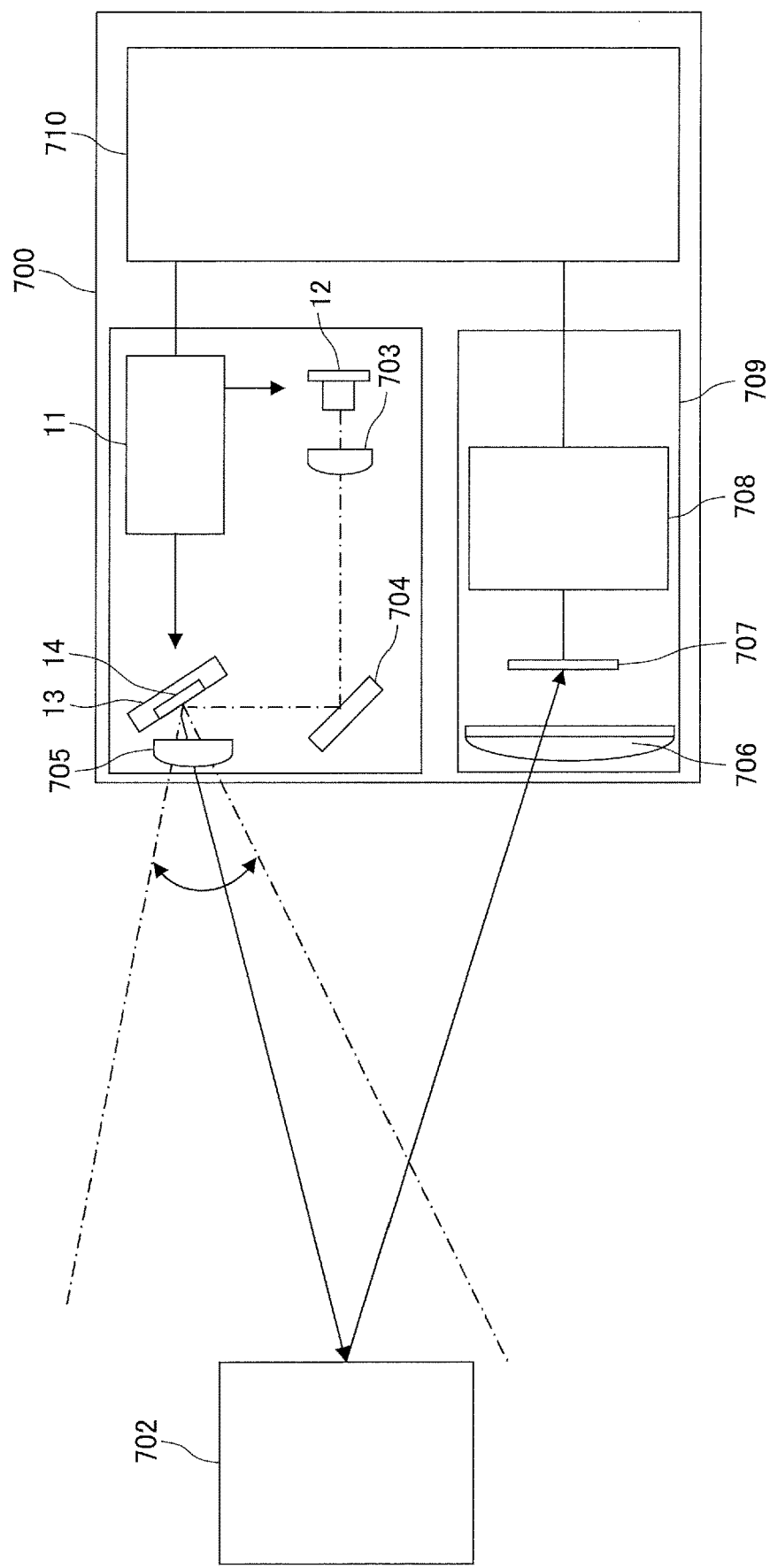
FIG. 24 is a schematic view of the LiDAR device according to an embodiment of the present disclosure.

Next, a distance measuring device to which the movable device according to the embodiment is applied is described in detail referring to FIGS. 23 and 24.

FIG. 23 is a schematic view of a vehicle equipped with a laser imaging detection and ranging (LiDAR) device as an example of a distance measuring device. FIG. 24 is a schematic view of an example of the LiDAR device.

The distance measuring device is a device that measures a distance in a target direction, and is, for example, a LiDAR device.

As illustrated in FIG. 23, for example, a LiDAR device 700 is provided for a vehicle 701 to perform optical scanning in a target direction and receive the light reflected from an object 702 that exists in the target direction. Accordingly, the LiDAR device 700 can measure the distance to the object 702.

As illustrated in FIG. 24, the laser beams emitted from a light-source device 12 pass through an incident optical system, and then are caused to perform scanning uniaxially or biaxially using the movable device 13 including the reflecting surface 14. The incidence optical system includes a collimator lens 703 that serves as an optical system that collimates divergent beams into approximately parallel beams, and a planar mirror 704. The parallel beams are emitted to the object 702 ahead of the device, as passing through, for example, a projection lens 705 that serves as a projection optical system. The driving of the light-source device 12 and the movable device 13 is controlled by the control device 11. The light reflected by the object 702 is detected by a photosensor 709. More specifically, the reflected light passes through, for example, a condenser lens 706 that serves as an incident-light receiving and detecting optical system, and is received by an image sensor 707. Then, the image sensor 707 outputs a detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photosensor 709 receives the laser beams or the phase difference per pixel of the image sensor 707 that have received the laser beams. Moreover, the distance measuring circuit 710 calculates distance information indicating the distance from the object 702.

The movable device 13 including the reflecting surface 14 is less likely broken and is compact compared with a polygon mirror, and thus, a highly durable and compact LiDAR device can be provided. Such a LiDAR device is attached to, for example, a vehicle, an aircraft, a ship, a robot, or the like, and can perform optical scanning within a predetermined range to determine whether an obstacle is present or absent to measure the distance from the obstacle. The installation position of the LiDAR device 700 is not limited to an upper and front portion of the vehicle 701, and the LiDAR device 700 may be mounted at a side surface or a rear portion of the vehicle 701.

In the present embodiment, the LiDAR device 700 is described as an example of the distance measuring device. However, no limitation is intended thereby. The distance measuring device may be any apparatus that performs optical scanning by controlling the movable device 13 provided with the reflecting surface 14, using the control device 11, and that receives the receives the reflected laser beam using a photodetector to measure the distance to the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object using the distance information, and refers to records to recognize the object. The security sensor performs optical scanning in a target range to recognize an incoming object. The three-dimensional scanner performs optical scanning to obtain distance information, calculates object information such as the shape of the object using the distance information to recognize the object, and outputs the object information in the form of three-dimensional data.

As described above, applying the light deflector according to an embodiment to a distance measuring device provides a distance measuring device that allows a stable connection between the movable device and the drive unit.

Figure 25:
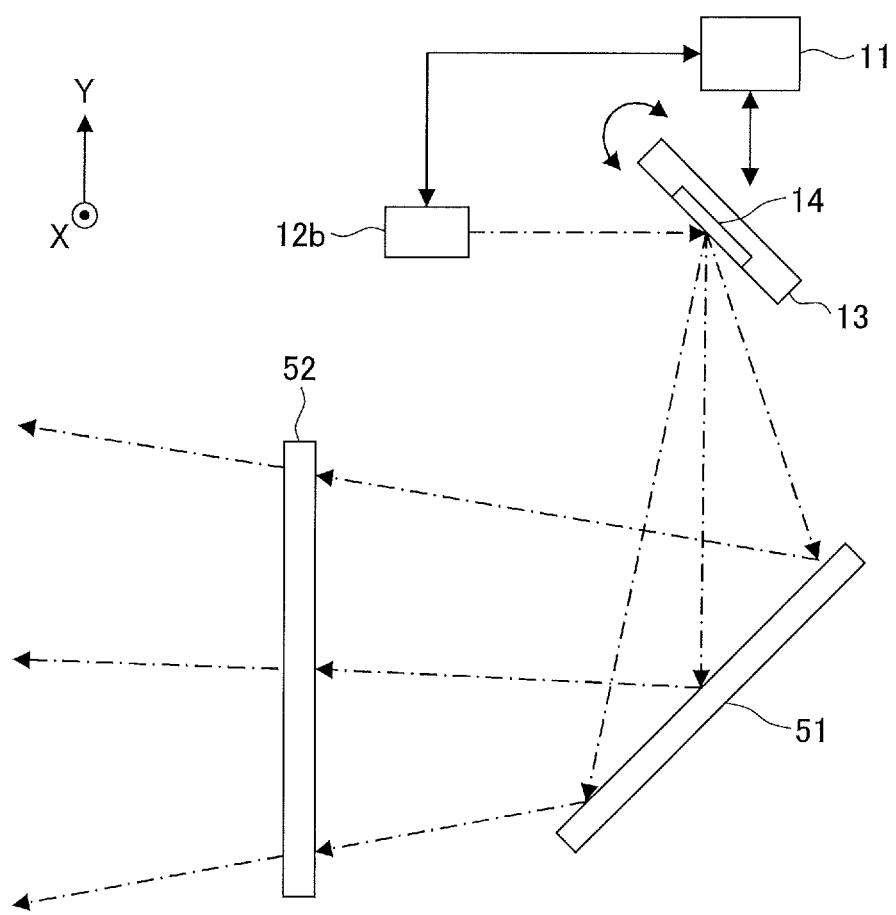
FIG. 25 is a schematic view of an example of a configuration of a laser headlamp.

Next, a laser headlamp 50 in which the movable device according to the present embodiment is applied to a headlight of a car is described with reference to FIG. 25. FIG. 25 is an illustration of the configuration of a laser headlamp 50 according to an embodiment of the present disclosure.

The laser headlamp 50 includes a control device 11, a light-source device 12*b*, a movable device 13 including a reflecting surface 14, a mirror 51, and a transparent plate 52.

The light-source device 12*b* is a light source that emits blue laser beams. The laser beam emitted from the light-source device 12*b* is incident on the movable device 13 and is reflected by the reflecting surface 14. The movable device 13 moves the reflecting surface 14 in the XY-direction in accordance with signals from the control device 11, and performs two-dimensional scanning using the blue laser beam emitted from the light-source device 12*b* in the XY-direction.

The scanning light of the movable device 13 is reflected by the mirror 51, and is incident on the transparent plate 52. The transparent plate 52 is coated with a yellow phosphor on the front surface or the back surface. The blue laser beams that are reflected by the mirror 51 are converted into white light whose color is within the range of the statutory color for a headlight as passing through the yellow phosphor (fluorescent material) of the transparent plate 52. Thereby, the front of the automobile is illuminated with white light from the transparent plate 52.

The scanning light of the movable device 13 scatters in a predetermined manner as passing through the fluorescent material of the transparent plate 52. Accordingly, glare is attenuated at an illuminated target in the area ahead of the vehicle.

When the movable device 13 is applied to a headlight of a vehicle, the color of light beams from the light-source device 12*b* and the color of the phosphor are not limited to blue and yellow, respectively. For example, the light-source device 12*b* may emit near-ultraviolet light, and the transparent plate 52 may be coated with homogenized mixture of multiple kinds of fluorescent materials of red-green-blue (RGB) trichromatic colors. In this case as well, the light passing through the transparent plate 52 can be converted into white light, and the front of the vehicle can be illuminated with white light.

As described above, applying the light deflector according to an embodiment to a laser headlamp provides a laser headlamp that allows a stable connection between the movable device and the drive unit.

Figure 26:
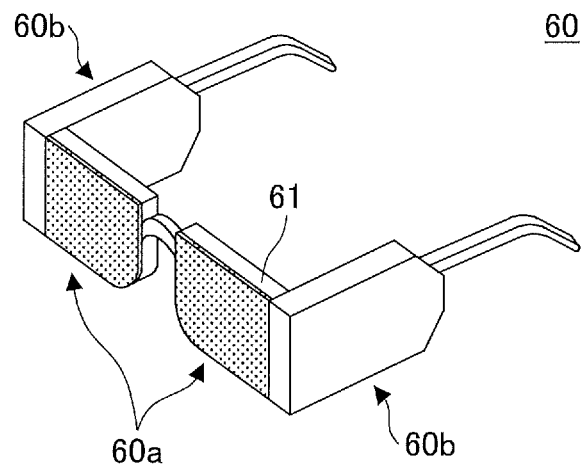
FIG. 26 is a perspective view of the configuration of a head-mounted display (HMD) according to an embodiment of the present disclosure.
Figure 27:
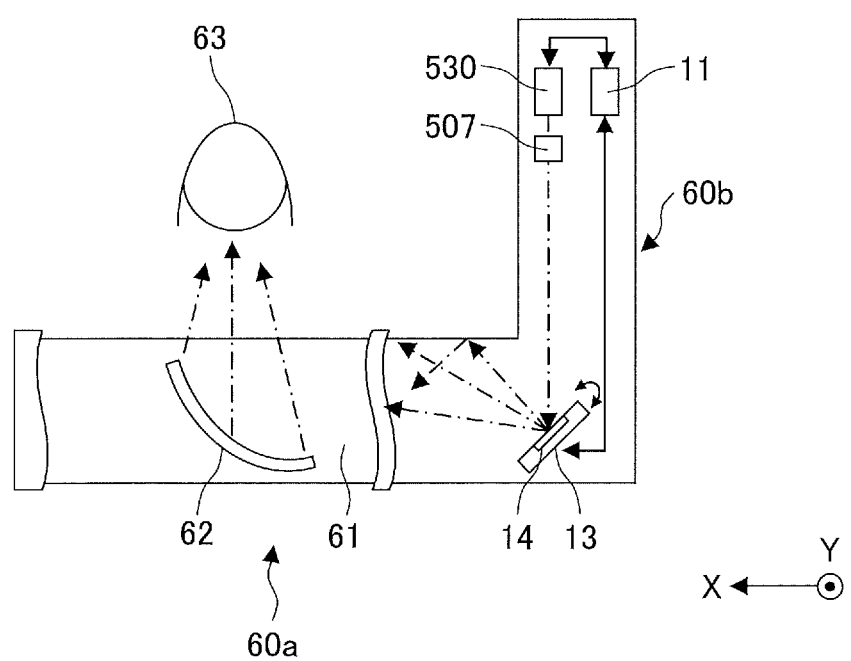
FIG. 27 is an illustration of the configuration of the HMD according to an embodiment of the present disclosure.

Next, a head-mounted display (HMD) 60 to which the movable device 13 according to an embodiment is applied is described referring to FIGS. 26 and 27. Note that the HMD 60 is a head-mounted display that can be mounted on a human head, and can be shaped like, for example, glasses. In the following description, such a head-mounted display may be referred to simply as an HMD.

FIG. 26 is a perspective view of the appearance of the HMD 60. In FIG. 26, the HMD 60 includes a pair of front temples and a pair of temples, the pair of front temples and the pair of 60*a* temples being substantially symmetrical to each other on the right and left sides of the 60*b*. The front 60*a* can include, for example, a light guide plate 61. An optical system, a control device, and the like, can be incorporated in the temple 60*b*.

FIG. 27 is an illustration of a configuration of a part of the HMD 60. Although the configuration for the left eye is illustrated in FIG. 27, the HMD 60 has a configuration similar to that for the right eye.

The HMD 60 includes a control device 11, a light source unit 530, a light-intensity adjuster 507, a movable device 13 including a reflecting surface 14, a light guide plate 61, and a semi-reflective mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R, 501G, and 501B are combined by the two dichroic mirrors 505 and 506. The combined parallel light is emitted from the light source unit 530.

The light intensity of the combined laser beams from the light source unit 530 is adjusted by the light-intensity adjuster 507. Then, the adjusted light is incident on the movable device 13. The movable device 13 moves the reflecting surface 14 in the XY-direction based on the signal from the control device 11, and performs two-dimensional scanning with the light emitted from the light source unit 530. The driving of the movable device 13 is controlled in synchronization with the light emission timings of the laser-beam sources 501R, 501G, and 501B, and a color image is formed with the scanning light.

The scanning light of the movable device 13 is incident on the light guide plate 61. The light guide plate 61 reflects the scanning light on the inner wall, and guides the scanning light to the half mirror 62. The light guide plate 61 is formed by, for example, resin that has transparency to the wavelength of the scanning light.

The semi-reflective mirror 62 reflects the light that is guided through the light guide plate 61 to the rear side of the HMD 60, and the reflected light exits towards an eye of a wearer 63 of the HMD 60. The semi-reflective mirror 62 has, for example, a free-form surface shape. An image formed of the scanning light is reflected by the semi-reflective mirror 62, thus being formed on the retina of wearer 63. Alternatively, the reflection at the semi-reflective mirror 62 and the effect of the crystalline lenses of eyeballs causes the image of the scanning light to be formed on the retina of the wearer 63. Moreover, due to the reflection at the semi-reflective mirror 62, the spatial distortion of the image is corrected. The wearer 63 can observe an image formed by the light of scanning in the XY direction.

The wearer 63 observes an image of external light superposed on the image of the scanning light because of the semi-reflective mirror 62. The semi-reflective mirror 62 may be replaced with a mirror to exclude the extraneous light. In such a configuration, only the image that is formed by scanning light can be observed.

As described above, applying the light deflector according to an embodiment to an HMD provides an HMD that allows a stable connection between the movable device and the drive unit.

Figure 28:
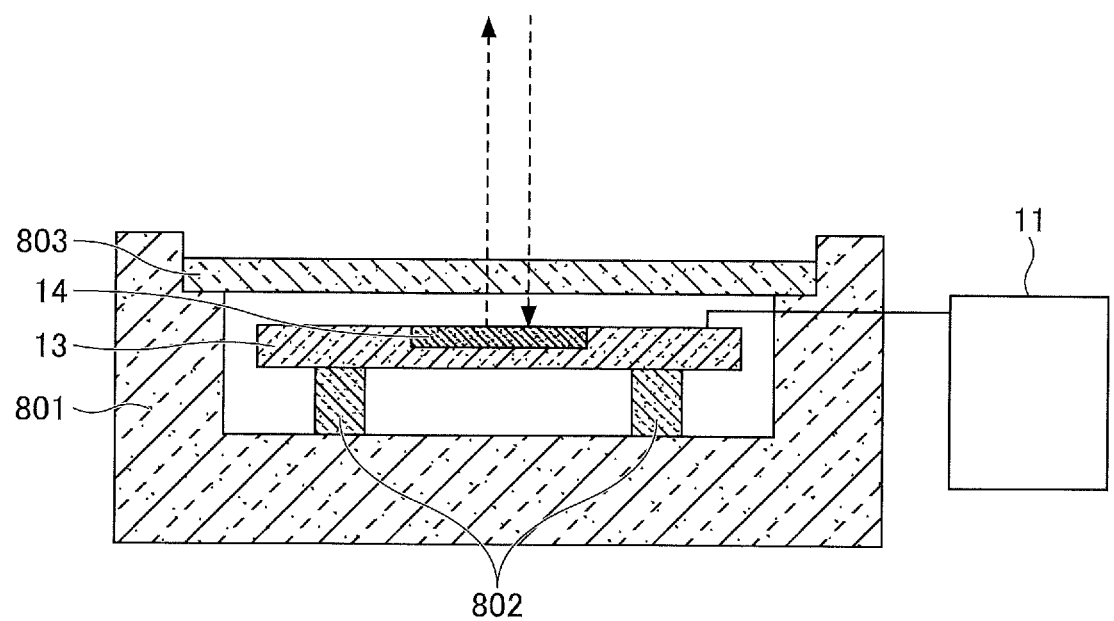
FIG. 28 is a schematic view of a packaged movable device.

Next, packaging of the movable device 13 according to the embodiment is described referring to FIG. 28.

FIG. 28 is a schematic view of an example of a packaged movable device 13.

As illustrated in FIG. 28, the movable device 13 is mounted on a mounting component 802 inside the package 801, and is hermetically sealed and packaged as a part of the package 801 is covered with a light transmission member 803. The package contains inert gas such as nitrogen and is sealed. This configuration can substantially prevent the deterioration of the movable device 13 due to oxidation, and increase the durability against changes in environment such as temperature.

In the illustration of FIG. 28, light proceeding in the forward direction from the drawing sheet is incident on the reflecting surface 14 and reflects off the reflecting surface 14.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A light deflector comprising:
a movable device including a movable portion;
a drive unit configured to drive the movable device;
an input wiring board configured to apply electric power from the drive unit to the movable device;
an anisotropic conductive resin film through which the input wiring board is connected to multiple input parts; and
wiring disposed in the movable portion,
the movable device further including:
a pair of drive beams, the movable portion including a reflector disposed between the pair of drive beams, the pair of drive beams supporting the movable portion to allow the movable portion to oscillate around an oscillation axis, each of the pair of drive beams including a beam member and an actuator;
a pair of supporting parts supporting the pair of drive beams, at least one of the pair of supporting parts including the multiple input parts to which electric power is input from the input wiring board; and
a mount unit secured to the pair of supporting parts,
the multiple input parts including a first input part and a second input part arranged at both ends in an arrangement direction in which the multiple input parts are arranged, and a third input part arranged between the first input part and the second input part, and
one of the pair of drive beams being connected, through the wiring, to the third input part in a state in which the wiring directly contacts the third input part without directly contacting the first input part and the second input part.

2. The light deflector according to claim 1, wherein the arrangement direction is orthogonal to the oscillation axis.

3. The light deflector according to claim 2, wherein the beam member of each of the pair of drive beams includes multiple beam members forming a meandering beam, and
wherein the arrangement direction extends along a longitudinal direction of the beam member.

4. The light deflector according to claim 1, wherein the input wiring board is a single input wiring board.

5. The light deflector according to claim 1, wherein the mount unit includes a light passing portion through which light reflected by the reflector passes.

6. A distance measuring device comprising:
a light source;
the light deflector according to claim 1; and
circuitry configured to control the light deflector to scan an object with light emitted from the light source to calculate a distance to the object.

7. A mobile object comprising the distance measurement device according to claim 6.

8. A projection device comprising:
a light source;
the light deflector according to claim 1 configured to deflect light emitted from the light source; and
an optical system configured to form an image with the light deflected by the light deflector,
wherein the projection device is configured to project the image formed by the optical system.

9. A mobile object comprising the projection device according to claim 8.

10. The light deflector according to claim 1,
wherein the first input part and the second input part are electrically connected with each other to form a loop separate from the third input part.

11. A light deflector comprising:
a movable device including a movable portion;
a sensor;
an output wiring board configured to output information based on electric power generated by the movable device to the sensor;
an anisotropic conductive resin film through which the output wiring board is connected to multiple output parts; and
wiring disposed in the movable portion,
the movable device further including:
  a pair of drive beams, the movable portion including a reflector disposed between the pair of drive beams, the pair of drive beams supporting the movable portion to allow the movable portion to oscillate around an oscillation axis, each of the pair of drive beams including a beam member and an actuator;
  a pair of supporting parts supporting the pair of drive beams, at least one of the pair of supporting parts including the multiple output parts configured to output the information to the sensor through the output wiring board; and
  a mount unit secured to the pair of supporting parts,
the multiple output parts including a first output part and a second output part arranged at both ends in an arrangement direction in which the multiple output parts are arranged, and a third output part arranged between the first output part and the second output part, and
one of the pair of drive beams being connected, through the wiring, to the third output part in a state in which the wiring directly contacts the third output part without directly contacting the first output part and the second output part.

12. The light deflector according to claim 11,
wherein the arrangement direction is orthogonal to the oscillation axis.

13. The light deflector according to claim 12,
wherein the beam member of each of the pair of drive beams includes multiple beam members forming a meandering beam, and
wherein the arrangement direction extends along a longitudinal direction of the beam member.

14. The light deflector according to claim 11,
wherein the output wiring board is a single output wiring board.

15. The light deflector according to claim 11,
wherein the mount unit includes a light passing portion through which light reflected by the reflector passes.

16. The light deflector according to claim 11,
wherein the first output part and the second output part are electrically connected with each other to form a loop separate from the third output part.

* * * * *